US008942571B2

(12) United States Patent
Chen et al.

(10) Patent No.: US 8,942,571 B2
(45) Date of Patent: Jan. 27, 2015

(54) APPARATUS AND METHOD FOR DATA EMBEDDING IN LIGHT COMMUNICATION AND THE LIGHT COMMUNICATION SYSTEM AND METHOD THEREOF

(71) Applicant: Industrial Technology Research Institute, Hsinchu (TW)

(72) Inventors: Chia-Pin Chen, Hsinchu (TW); Chang-Lung Hsiao, Hsinchu County (TW); Ren-Jr Chen, Hsinchu (TW); Pei-Wei Hsu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 158 days.

(21) Appl. No.: 13/726,394

(22) Filed: Dec. 24, 2012

(65) Prior Publication Data
US 2014/0178080 A1    Jun. 26, 2014

(51) Int. Cl.
*H04B 10/00* (2013.01)
*H04B 10/116* (2013.01)

(52) U.S. Cl.
CPC .................................... *H04B 10/116* (2013.01)
USPC ............................ 398/172; 398/130; 398/183

(58) Field of Classification Search
CPC ............. H04B 10/116; H04B 10/1123; H04B 10/1141; H04B 10/1149
USPC .................. 398/118, 130, 183, 186–188, 172
See application file for complete search history.

(56) References Cited

U.S. PATENT DOCUMENTS

| 7,127,079 B2 | 10/2006 | Keating et al. |
| 7,889,999 B2 | 2/2011 | Ann |
| 7,949,259 B2 | 5/2011 | Suzuki |
| 7,983,568 B2 | 7/2011 | Won et al. |

(Continued)

FOREIGN PATENT DOCUMENTS

| CN | 1965509 A | 5/2007 |
| TW | I280049 B | 4/2007 |
| WO | 2010099738 A1 | 9/2010 |

OTHER PUBLICATIONS

Okada H et al: "Successive Interference Cancellation for Hierarchical Parallel Optical Wireless Communication Systems", Communications, 2005 Asia-Pacific Conference on Perth, Western Australia Oct. 3-5, 2005, Piscataway, NJ, USA, IEEE,Oct. 3, 2005, pp. 788-792, XP010860892, DOI: 10.1109/APCC.2005.1554170, ISBN: 978-0-7803-9132-1, The Whole Document.

(Continued)

Primary Examiner — Dzung Tran
(74) Attorney, Agent, or Firm — Lin & Associates IP, Inc.

(57) ABSTRACT

In a light communication system, a data embedding unit arranged between a transmitter-side communication data processing unit and a light emitting device driver embeds a communication processed data at a spatial domain of an original image according to a modulation scheme, and gets multiple RGB values for a communication data embedded image. A receiving apparatus detects a transmitter-side communication data embedded image, generates a receiver-side communication data embedded image, compensate a deformation of the receiver-side communication data embedded image, outputs a warped communication data embedded image, and extracts a communication processed data from the warped communication data embedded image.

42 Claims, 21 Drawing Sheets

(56) References Cited

U.S. PATENT DOCUMENTS

| | | | |
|---|---|---|---|
| 8,188,879 B2 | 5/2012 | Pederson | |
| 2007/0058987 A1* | 3/2007 | Suzuki | 398/183 |
| 2009/0175594 A1 | 7/2009 | Ann et al. | |
| 2010/0135673 A1 | 6/2010 | Son et al. | |
| 2010/0209118 A1 | 8/2010 | Takene et al. | |
| 2011/0063510 A1 | 3/2011 | Lee et al. | |
| 2011/0216049 A1* | 9/2011 | Jun et al. | 345/207 |
| 2012/0087677 A1* | 4/2012 | Jang et al. | 398/183 |
| 2012/0155889 A1* | 6/2012 | Kim et al. | 398/193 |

OTHER PUBLICATIONS

Samuel David Perli; "PIXNET: Designing Interference-Free Wireless Links Using LCD-Camera Pairs", Oct. 26, 2010, XP055109625, Retrieved From the Internet: URL:http://groups.csail.mit.edu/netmit/wordpress/wp-content/themes/netmit/papers/Sam MS.pdf, [retrieved on Mar. 24, 2014], The Whole Document.

European Patent Office, Search Report with Written Opinion, Patent Application Serial No. EP13179994, Mar. 25, 2014, Europe.

P. Toft, "Using the generalized Radon transform for detection of curves in noisy images", ICASSP 1996, vol. 4, 99. 2219-2222.

O. Bouchet et al. , "Omega-project-flyer-2nd-edition-2011", Information & Communication Technologies (ICT), Feb. 2011.

Eun Tae Won et al., "Visible Light Communication: Tutorial", IEEE 802.15, Mar. 2008.

Toshihiko Komine, Masao Nakagawa, "Fundamental Analysis for Visible-Light Communication System using LED Lights", IEEE Trans. on Consumer Electronics, vol. 50, No. 1, Feb. 2004.

Dominic C. et al., "Visible Light Communications: Challenges and Possibilities", 2008 International Symposium on Personal Indoor and Mobile Radio Communications.

C.-S. Tsai et al., "Embedding Robust Gray Level Watermark in an Image Using Discrete Cosine Transformation" Chapter 13, Distributed Multimedia Databases: Techniques and Applications, (USA), Idea Group Publishing, pp. 206-223, Jan. 2002.

Taiwan Patent Office, Office Action, Patent Application Serial No. TW101149574, Aug. 27, 2014, Taiwan.

* cited by examiner

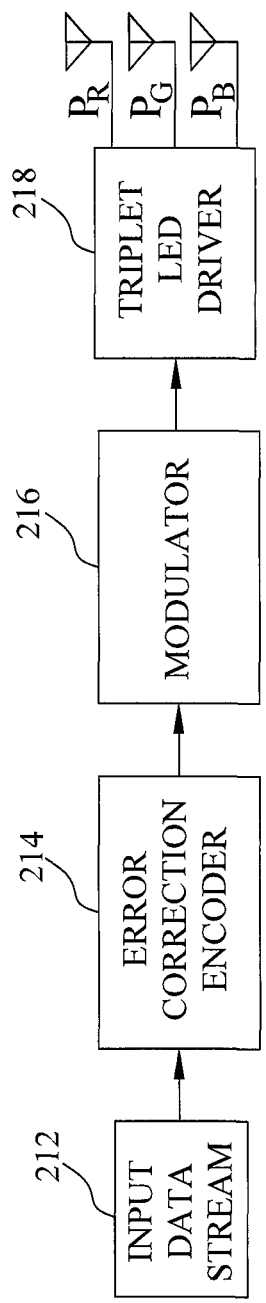
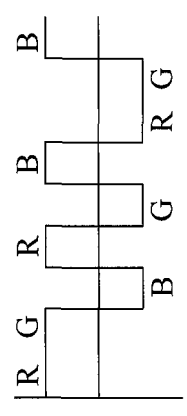
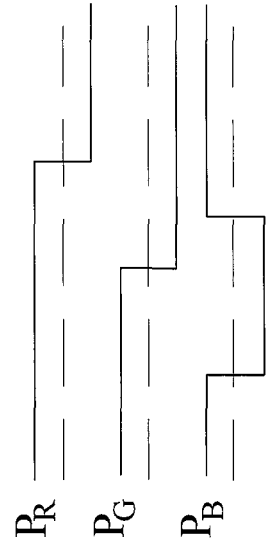
FIG 2A (PRIOR ART)
FIG 2B (PRIOR ART)
FIG 2C (PRIOR ART)

APPARATUS AND METHOD FOR DATA EMBEDDING IN LIGHT COMMUNICATION AND THE LIGHT COMMUNICATION SYSTEM AND METHOD THEREOF

TECHNICAL FIELD

The present disclosure relates generally to an apparatus and method for data embedding in light communication and the light communication system and method thereof.

BACKGROUND

Light communication is a wireless communication technology that uses human visible light with frequency among 400 THz to 800 THz. RF bandwidth is a scarce resource. Therefore, visible light communication may provide an alternate technology to meet the strong demands of wireless communications. For example, the visible light emitted from one or more light emitting diodes (LEDs) is widely used in homes and offices, thus it makes the visible light emitted from the one or more LEDs ideal for ubiquitous data transmitters. FIG. 1A and FIG. 1B show schematic views of two exemplary types of white-light LEDs, respectively. FIG. 1A shows an exemplary white-light LED using a blue LED 110 and a yellow phosphor 115. The yellow phosphor 115 limits the modulation bandwidth no more than about 10 Mbps. FIG. 1B shows another exemplary type of a white-light LED using a RGB triplet that may include a blue LED 121, a red LED 122 and a green LED 123, and these three LEDs emit blue light 131, red light 132 and green light 133, respectively. Compared with the white-light LED shown in FIG. 1A, the RGB triplet has a potentially higher bandwidth and the mixing of the triplet may generate any desired colors by any combination of a blue light, a red light and a green light. Therefore, a RGB triplet LED array may be used as a high-bit-rate data transmitter and a lighting device at the same time.

FIG. 2A shows a schematic view of a general transmitter 200 using RGB triplet LEDs with a single input data stream 212. In the transmitter 200, the single input data stream 212 is received by an error correction encoder 214, and the output of a modulator 216 is applied to a triplet LED driver 218 directly. Three output powers $P_R$, $P_G$ and $P_B$ of three primary colors (i.e. red, green and blue) are generated by the triplet LED driver 218. FIG. 2B shows an example of the output of the modulator with an on-off keying modulation scheme. The bit stream outputted by the modulator 216 is distributed to the triplet LEDs sequentially, wherein R, G and B represent three bit streams of three primary colors, respectively. FIG. 2C shows an example of the output powers of the triplet LED driver.

FIG. 3A shows a schematic view of a wavelength division multiplexing (WDM) transmitter 300 using RGB triplet LEDs with multiple input data. In the transmitter 300, each of multiple input data such as input data0, input data1 and input data2, has individual error correction encoder and modulator. The outputs of three modulators are coupled to three LED drivers directly. FIG. 3B shows an example of the output powers of the three LED drivers.

FIG. 4 shows a schematic view of a technique for visible light communication (VLC). As shown in the FIG. 4, a VLC apparatus may comprise a transmitting side device 410 and a reception side device 420. The transmitting side device 410 for transmitting a plurality of communication data (such as data 1, data 2, data 3, etc.) includes an illuminator 412 for generation of the illumination light, a communication amount adjuster 413 and a modulator 411. The communication amount adjuster 413 receives each of a plurality of communication data signals, and generates a dummy data for a corresponding one of the plurality of individual light sources so that data to be transmitted through each of light sources has an equal communication amount. The modulator 411 modulates each of the received communication data signals and the received dummy data into a driving signal for said each of the plurality of light sources.

FIG. 5 shows a schematic view illustrating a data transmitting apparatus using visible light communication. As shown in the FIG. 5, the data transmitting apparatus 510 may comprise a code generator 512 that converts transmitting data to a two-dimensional data code 520 having different colors and patterns according to times $T_0, T_1, \ldots, T_{N-1}, T_N$, a modulation unit 514 that generate a modulation signal by modulation the two-dimensional data code, a plurality of LEDs 518 that are arranged in a two-dimensional form and emit light, and a light source driver 516 that controls the turn-on of the LEDs 518 according to the modulation signal.

From the aforementioned technologies, it may be seen that if the output of the modulator(s) or modulation unit(s) is applied to the LED driver(s) directly, the respective energy distribution of the three primary colors may be different from one another. Therefore, there may be an undesirable color tone in the situation. Also, the time varying luminance may be sensible by the human eyes when the transmitter serves as a lighting device at the same time. Light communication is still a potential solution to the global wireless spectrum shortage. Various solutions for visible light communication techniques have been suggested. There are challenges in these solutions for using an apparatus to perform image or video display and light communication simultaneously.

SUMMARY

The exemplary embodiments of the disclosure may provide an apparatus and method for data embedding in light communication and the light communication system and method thereof.

One exemplary embodiment relates to an apparatus for data embedding in light communication, adapted to a transmitter. The apparatus for data embedding in light communication may comprise a data embedding unit arranged between a transmitter-side communication data processing unit and a light emitting device driver in the transmitter. The data embedding unit embeds a communication processed data at a spatial domain of an original image according to a modulation scheme, and gets multiple RGB values for a communication data embedded image.

Another exemplary embodiment relates to a method for data embedding in light communication, adapted to a transmitter. The method for data embedding in light communication may comprise: arranging a data embedding unit between a transmitter-side communication data processing unit and a light emitting device driver in the transmitter; embedding, by using the data embedding unit, a communication processed data at a spatial domain according to a modulation scheme to generate a communication modulated image; and performing an inverse transform and a domain transform that transforms the communication modulated image from a frequency domain into the spatial domain, and getting multiple RGB values for a communication data embedded image.

Yet another exemplary embodiment relates to a receiving apparatus for data embedding in light communication. The receiving apparatus may comprise an image sensing device, an image warping unit, and a data extraction unit. The image sensing unit detects a transmitter-side communication data embedded image transmitted by a light emitting device, and generates a receiver-side communication data embedded image. The image warping unit compensates a deformation of the receiver-side communication data embedded image by performing an image warping processing on the transmitter-side communication data embedded image, and outputs a warped communication data embedded image. The data extraction unit extracts a communication processed data from the warped communication data embedded image.

Yet another exemplary embodiment relates to a receiving method for data embedding in light communication. The receiving method may comprise: configuring an image warping unit and a data extraction unit between an image sensing device and a receiver-side communication data processing unit; detecting a transmitter-side communication data embedded image transmitted by a light emitting device and generating a receiver-side communication data embedded image, by using the image sensing device; performing an image warping processing on the transmitter-side communication data embedded image and outputting a warped communication data embedded image, by using the image warping unit; and extracting a communication processed data from the warped communication data embedded image, by using the data extraction unit.

Yet another exemplary embodiment relates to a light communication system. The light communication system may comprise a transmitter and a receiving apparatus. The transmitter embeds a communication processed data at one or more frequency coefficients of a frequency domain transform of an original image, performs an inverse transform and a domain transform on the communication modulated image, and forms a communication data embedded image by embedding multiple RGB values in the original image. The receiving apparatus detects the communication data embedded image transmitted by a light emitting device and generates a receiver-side communication data embedded image, and performs an image warping processing to recover the communication data embedded image by the receiver-side communication data embedded image, and extracts the communication processed data from a warped communication data embedded image.

Yet another exemplary embodiment relates to a light communication method. The light communication method may comprise: in a transmitter, embedding a communication processed data at one or more frequency coefficients of a frequency domain transform of an original image, performing an inverse transform and a domain transform on the communication modulated image, and forming a communication data embedded image by embedding multiple RGB values in the original image; and in a receiving apparatus, detecting the communication data embedded image transmitted by a light emitting device and generating a receiver-side communication data embedded image, and performing an image warping processing to recover the communication data embedded image by the receiver-side communication data embedded image, and extracting the communication processed data from a warped communication data embedded image.

BRIEF DESCRIPTION OF THE DRAWINGS

FIG. 2A shows a schematic view of a general transmitter using RGB triplet LEDs with a single input data stream.

FIG. 2B shows an example of the output of the modulator with an on-off keying modulation scheme.

FIG. 2C shows an example of the output powers of the triplet LED driver.

DETAILED DESCRIPTION OF DISCLOSED EMBODIMENTS

Figure 1B:
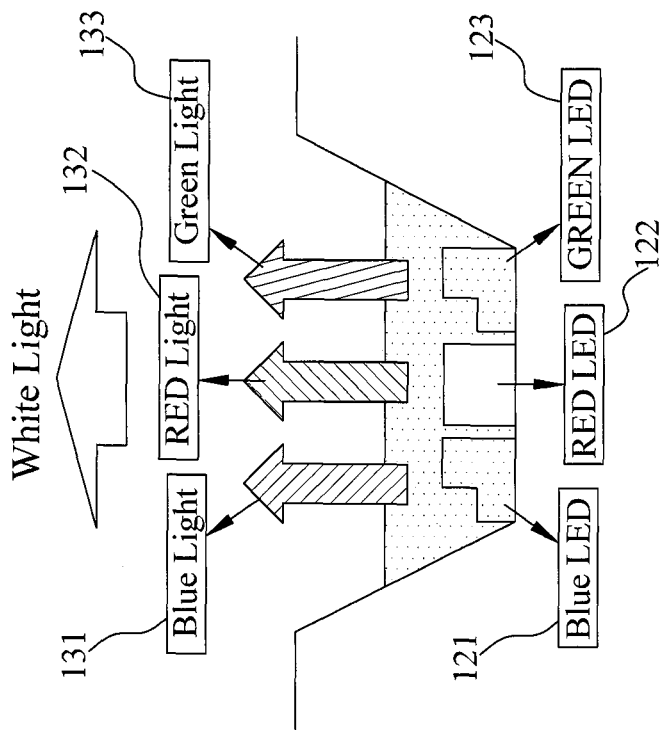
FIG. 1A and FIG. 1B show schematic views of two exemplary types of white-light LEDs, respectively.
Figure 1A:
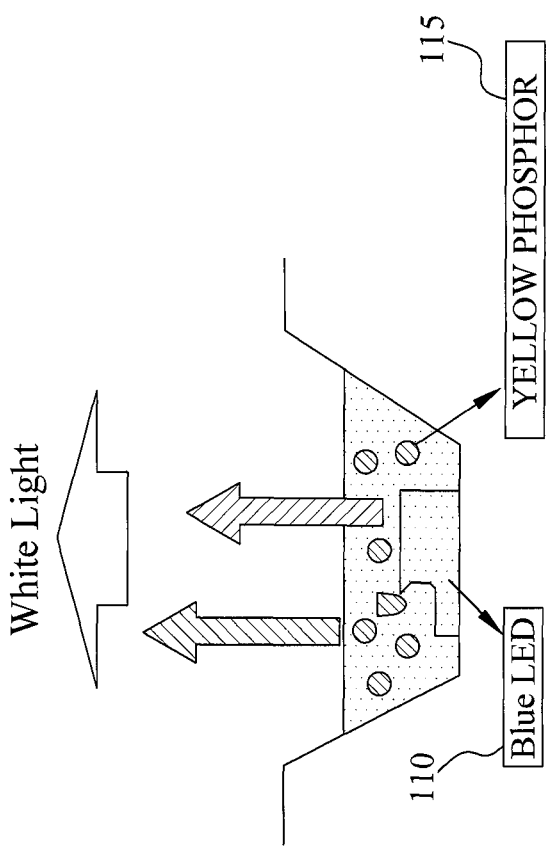
Figure 3A:
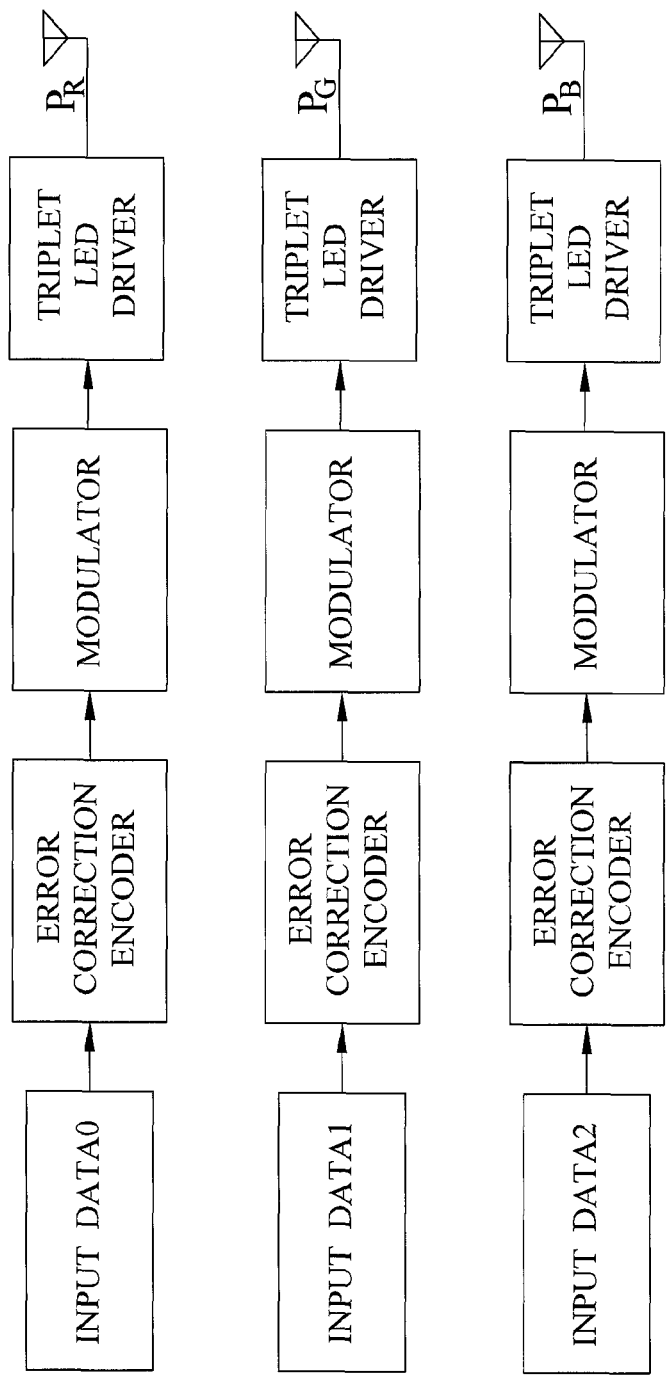
FIG. 3A shows a schematic view of a WDM transmitter using RGB triplet LEDs with multiple input data streams.
Figure 3B:
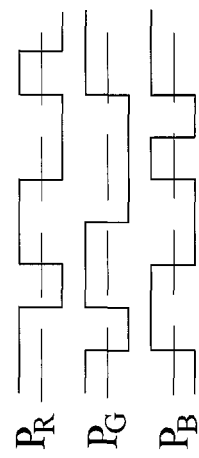
FIG. 3B shows an example of the output powers of the three LED drivers.
Figure 4:
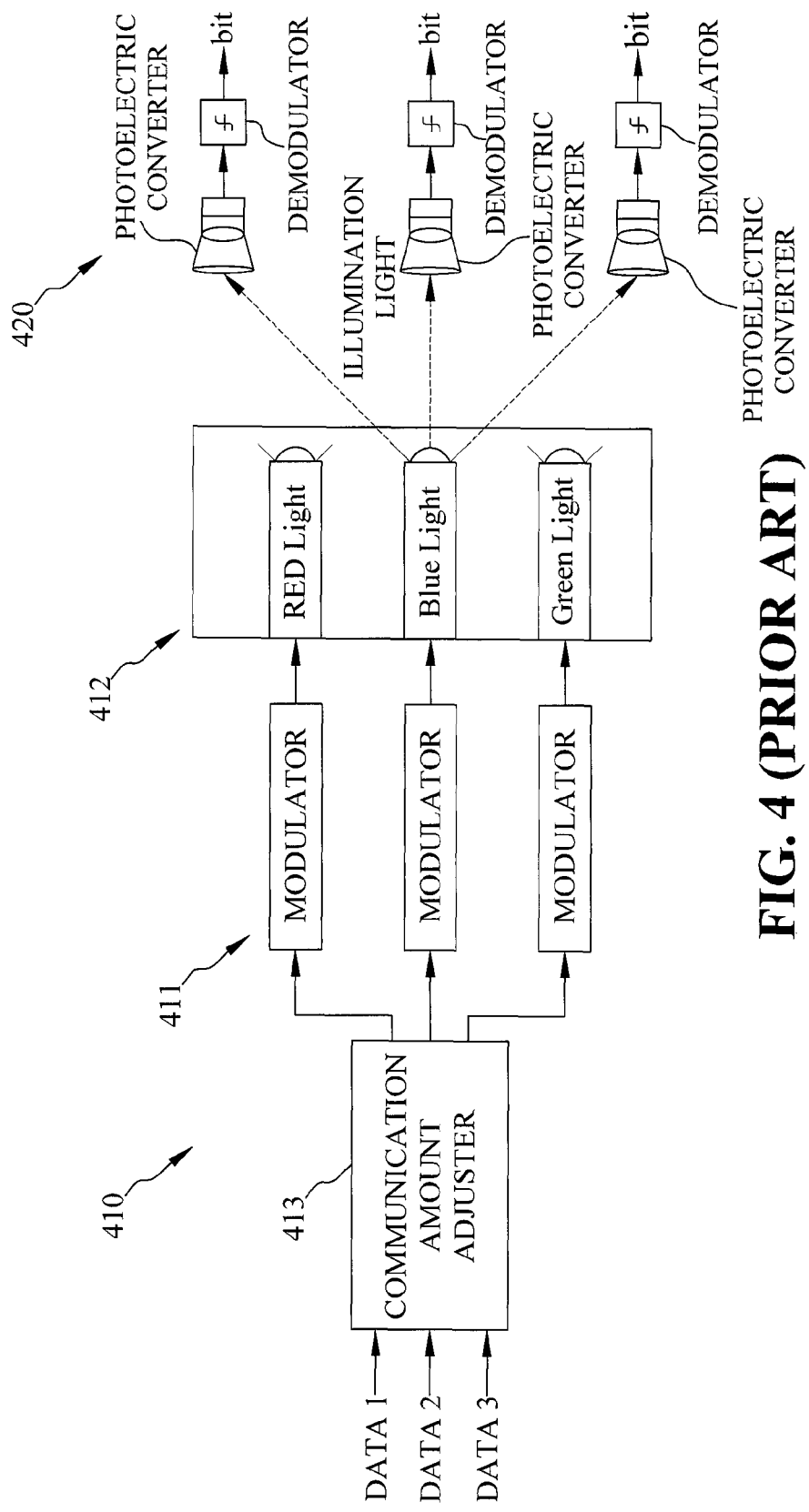
FIG. 4 shows a schematic view of a technique for visible light communication.
Figure 5:
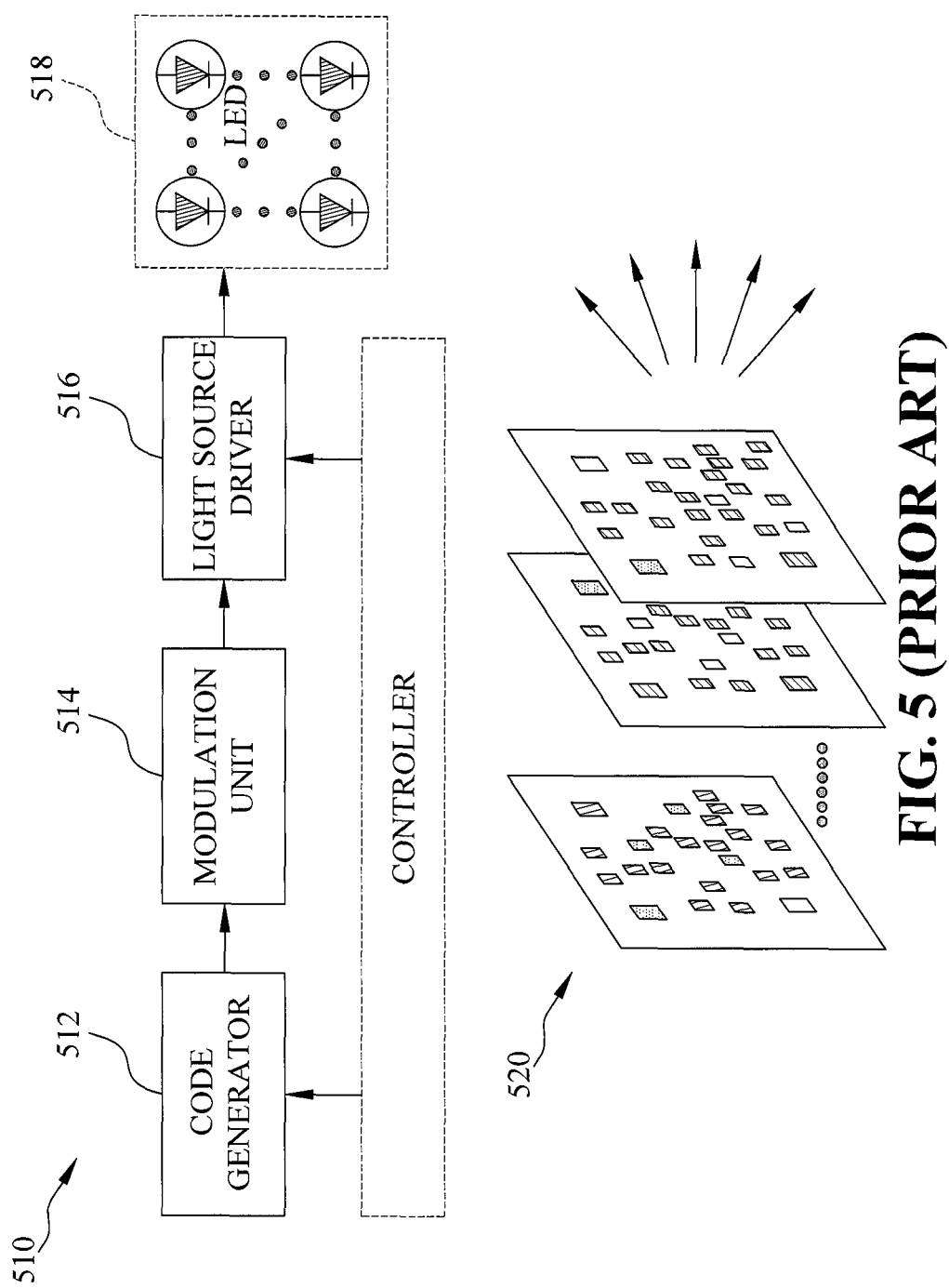
FIG. 5 shows a schematic view illustrating a data transmitting apparatus using visible light communication.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a technique for data embedding in light communication to perform image or video display and light communication simultaneously. The technique employs a data embedding technique for the communication processed data before applying the communication processed data to the light emitting device driver or the image/video display driver. Instead of directly applying the communication processed data to the light emitting device driver such as LED driver, the disclosed exemplary embodiments embed the communication processed data on the eye insensitive part of the frequency coefficients in the spatial domain of the image or the video when light communication is performed.

Figure 6:
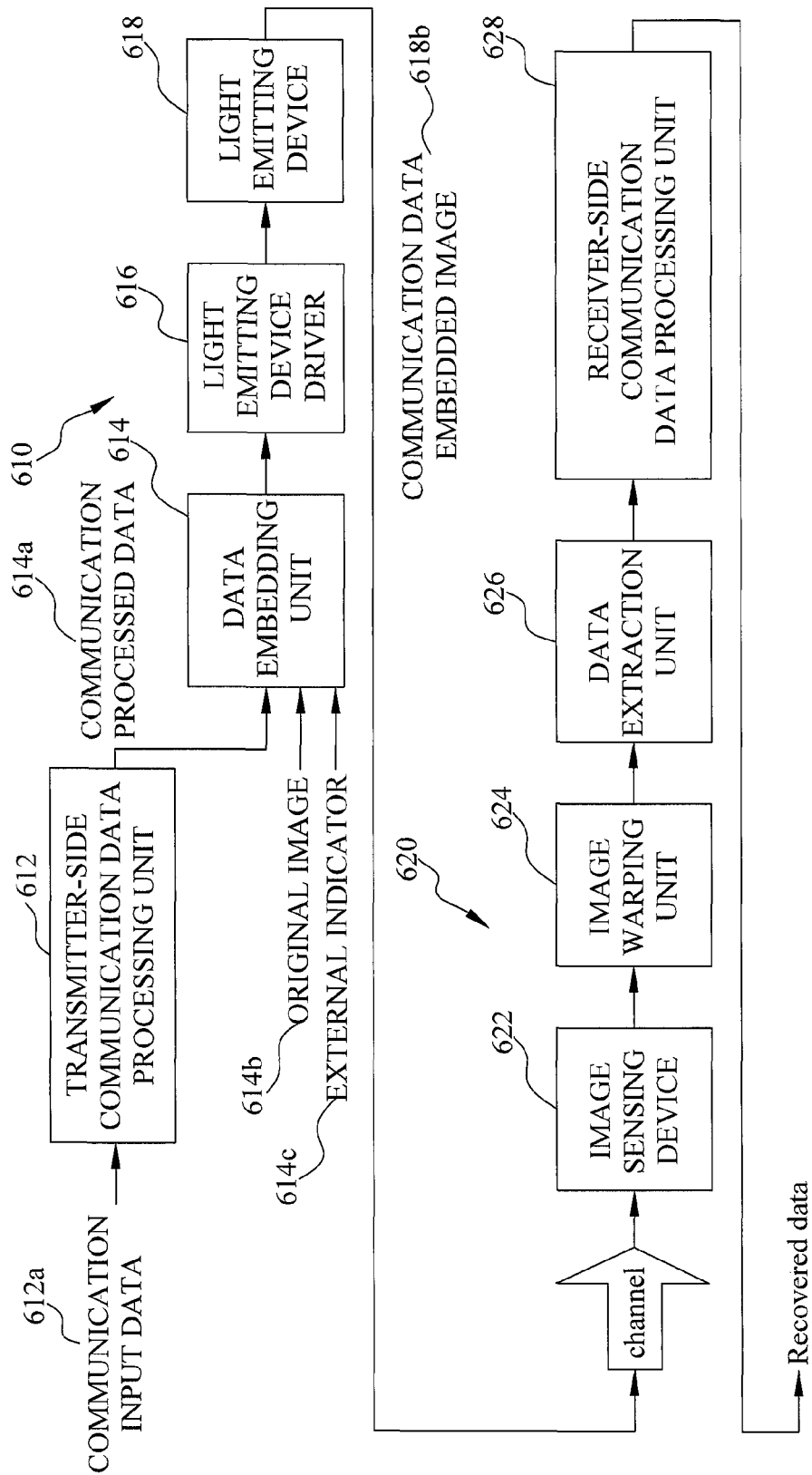
FIG. 6 shows a schematic view of a light communication system, according to an exemplary embodiment.

As seen in FIG. 6, one exemplary embodiment of a light communication system 600 may comprise a transmitting side device 610 and a receiving side device 620. The transmitting side device 610 may comprise a transmitter-side communication data processing unit 612, a data embedding unit 614, a light emitting device driver 616 and a light emitting device 618. The transmitter-side communication data processing unit 612 may perform a signal processing of communication input data 612a. The data embedding unit 614 may embed the communication processed data 614a at one or more frequency coefficients of a frequency domain transform of an original image 614b according to a modulation coding scheme. Before embedding the communication processed data 614a, an external indicator 614c may be used to indicate whether or not a pre-processing procedure is performed. The external indicator 614c may be generated by a software module or a hardware element. The light emitting device driver 616 may drive the light emitting device 618 according to the output data processed by the data embedding unit 614.

The receiving side device 620 may comprise an image sensing device 622, an image warping unit 624, a data extraction unit 626 and a receiver-side communication data processing unit 628. The image sensing unit may detect a communication data embedded image 618b transmitted from the light emitting device 618 via a channel. The image warping unit 624 may perform an image warping functions to compensate the deformation of a sensed image from the image sensing unit. The data extraction unit 626 may extract the communication processed data 614a from an output of the image warping unit 624. The receiver-side communication data processing unit 628 performs the common communication data processing such as demodulation and error correction, to recover the communication input data 612a from the communication processed data extracted by the data extraction unit 626.

Figure 7:
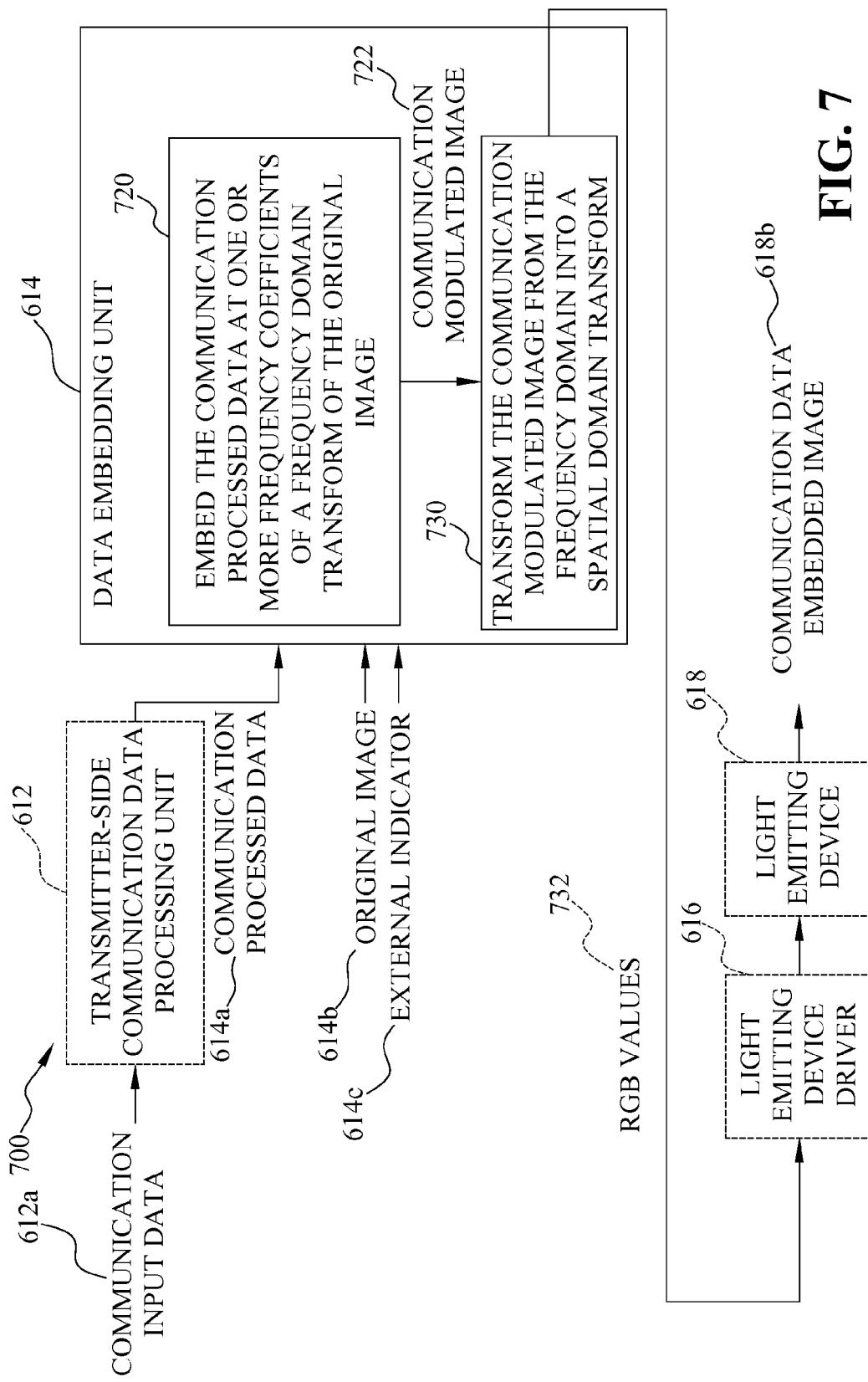
FIG. 7 shows an apparatus for data embedding in light communication, adapted to a transmitter, according to an exemplary embodiment.

As mentioned in FIG. 6, the transmitter-side communication data processing unit may perform the common communication signal processing in the transmitting side device, such as error correction encoding and modulation etc, to generate the communication processed data. The communication processed data may be, but not limited to, a bit stream of a stream of signals, such as I/Q pairs. FIG. 7 shows an apparatus for data embedding in light communication, adapted to a transmitter 700, according to an exemplary embodiment. Referring to FIG. 7, the apparatus for data embedding in light communication may comprise the data embedding unit 614 arranged between a transmitter-side communication data processing unit 612 and a light emitting device driver 616 in the transmitter 700. The data embedding unit 614 may embed the communication processed data 614a at one or more frequency coefficients of a frequency domain transform such as a discrete cosine transform (DCT) of the original image 614b (step 720) according to a modulation scheme. The original image 614b without embedded communication data may be a still image or a frame in a video sequence. After embed the one or more frequency coefficients of a frequency domain transform, the data embedding unit performs a domain transform such as an inverse DCT (IDCT) that transforms the communication modulated image from the frequency domain into a spatial domain transform (step 730), and gets multiple RGB values 732 for a communication data embedded image 618b such as by transferring the luminance and chrominance signals to RGB signals.

In other words, the data embedding unit 614 may generate a communication modulated image 722, and gets multiple RGB values for a communication data embedded image. The data embedding unit may embed the communication processed data by inserting one or more frames modulated by one or more image intensities inter a plurality of original frames over the original image. The one or more frames inserted are modulated by the one or more intensities of one or more partial images in different regions over the original image.

The data embedding unit may generate a communication modulated image by embedding the communication processed data at one or more frequency coefficients of a frequency domain transform of the original image. The data embedding unit may generate the communication data embedded image by embedding the communication modulated image in the original image in a frequency domain, performing the frequency domain transform, and transferring a plurality of luminance and chrominance data to the multiple RGB values. Or the data embedding unit may perform a domain transform from a frequency domain to a spatial RGB domain for the communication modulated image, and transferring a plurality of resulted luminance and chrominance data to the multiple RGB values, and generates the communication data embedded image by embedding the multiple RGB values in the original image. Or the data embedding unit may perform a domain transform from a frequency domain to the spatial domain for the communication modulated image, and generate the communication data embedded image by embedding a transformed result with the original image and transferring a plurality of resulted luminance and chrominance data of a data embedded image to the multiple RGB values.

Before embedding the communication processed data, the apparatus for data embedding in light communication may perform a pre-processing procedure according to the external indicator 614c. For example, the pre-processing procedure may include transferring the pixel arrays of the original image 614b from a first domain such as a RGB domain to a second domain such as a YUV (or YCbCr) domain and performing the DCT on the pixel arrays in the YUV domain. The external indicator 614c indicates whether or not the pre-processing procedure is performed. The external indicator may be generated by a software module or a hardware element. The data embedding unit may embed the communication processed data at one or more predefined frequency coefficients of such as the discrete cosine transform (DCT) of the original image. The light emitting device driver drives the light emitting device according to the signal processed by the data embedding unit. The output of the light emitting device 618 in the transmitter is a communication data embedded image to be transmitted for light communication.

Figure 8:
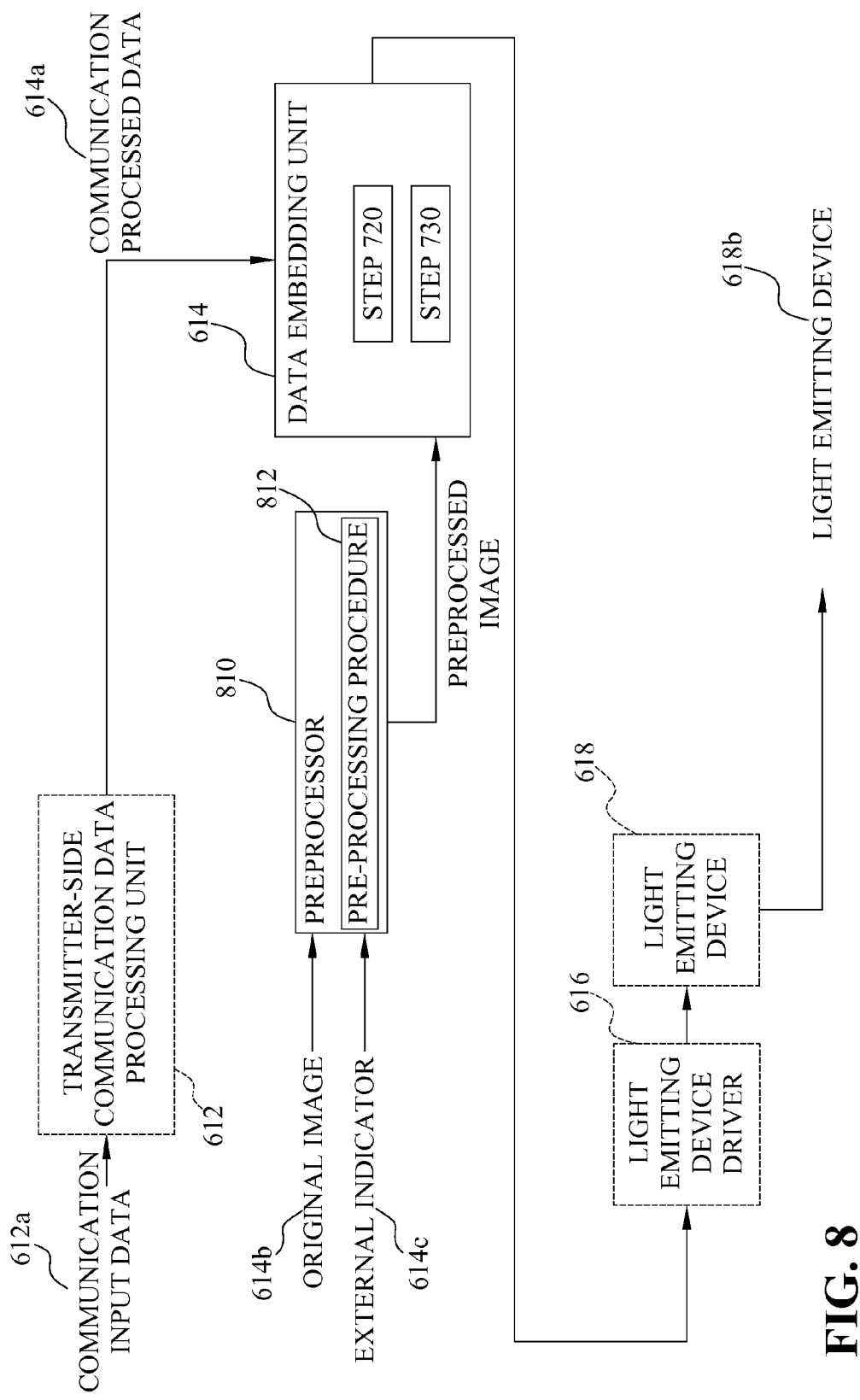
FIG. 8 shows a block diagram of the apparatus for data embedding in light communication including a preprocessor, according to one exemplary embodiment.

Accordingly, as shown in an exemplary embodiment of FIG. 8, the apparatus for data embedding in light communication shown in FIG. 7 may further include a preprocessor 810 configured to perform a pre-processing procedure 812 before embedding the communication processed data, according to the external indicator 614c. After the pre-processing procedure, the data embedding unit 614 embeds the communication processed data 614 at the one or more frequency coefficients of a spatial domain (i.e. perform the steps 720 and 730), and gets the multiple RGB values 732 of the communication data embedded image 618b.

Figure 9:
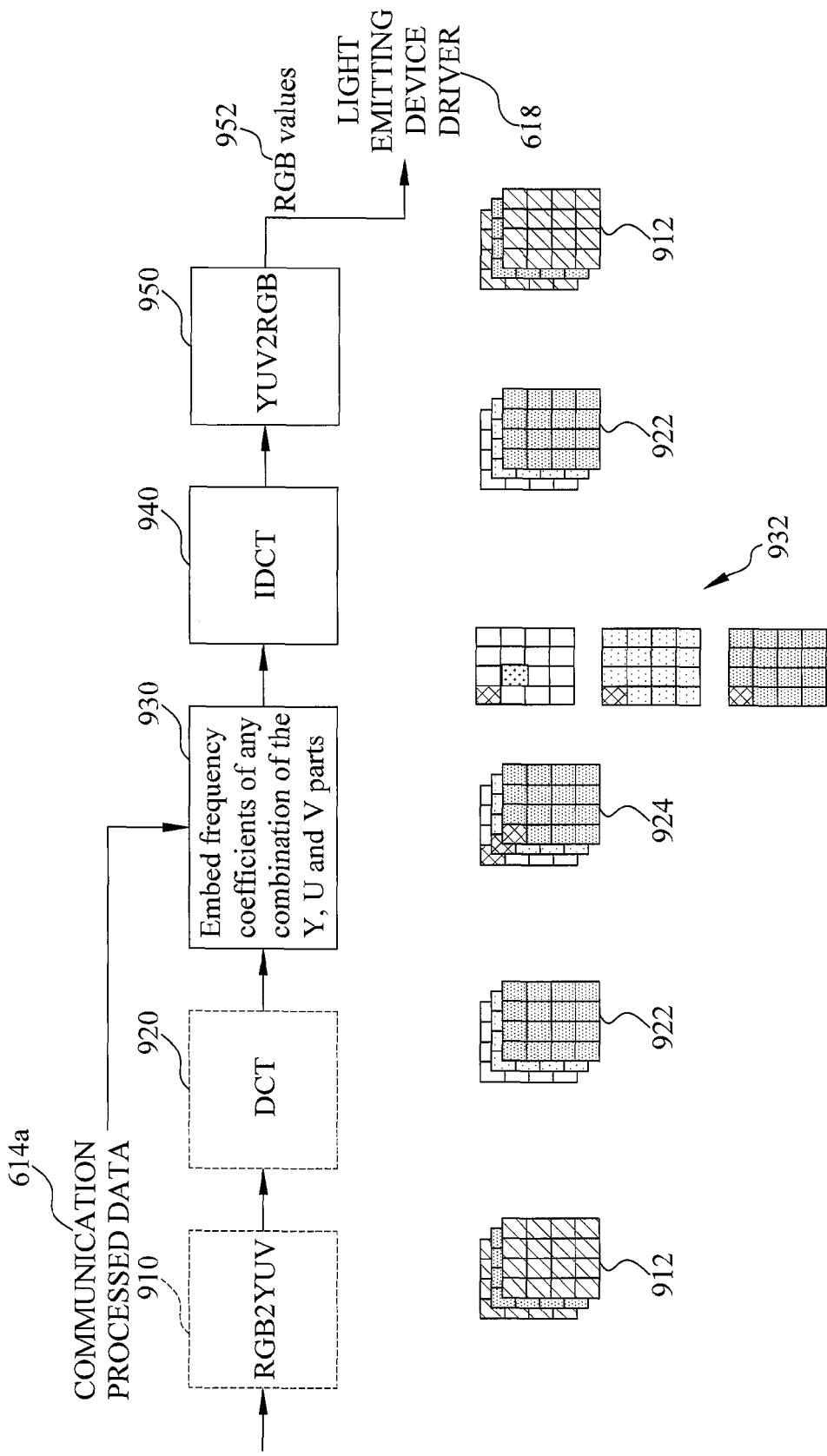
FIG. 9 shows the operation of the data embedding unit, by taking an original input image as an example, according to an exemplary embodiment.

FIG. 9 shows the operation of the apparatus for data embedding in light communication, adapted to a transmitter, by taking an original image as an example, according to an exemplary embodiment. In this embodiment, the original input image is composed of 8×8 RGB pixel arrays 912. When the external indicator 614c indicates the pre-processing procedure should be performed, the preprocessor 810 performs a pre-processing procedure before embedding the communication processed data, such as transferring the pixel arrays 912 of an original image from a RGB domain to another domain such as a YUV (or YCbCr) domain (i.e. step 910 of RGB2YUV) to generate pixel arrays in the YUV (or YCbCr) domain 922 and performing a DCT (i.e. step 920) on the pixel arrays 922 in the YUV domain to generate pixel arrays 932 of a communication modulated image after the DCT. The external indicator 614c may be generated by using a software programming register or a hardware element.

The data embedding unit 614 may embed the communication processed data 614a at the one or more frequency coefficients of any combination of the Y, U and V parts of the DCT blocks (i.e. step 930 of embedding frequency coefficients of any combination of the Y, U and V parts) according to a modulation coding scheme, thereby producing, for example, three pixel arrays 932 that have been embedded the communication processed data 614a on the frequency coefficients of a spatial domain. The data embedding unit 614 may remove the coefficients of the original input image and add at least one value according to the communication processed data 614a and the modulation type. The data embedding unit 614 may perform an IDCT (step 940) to recover the pixel arrays 922 and a YUV (YCbCr) to RGB transform (i.e. step 950) sequentially to obtain multiple RGB values 952 of a communication data embedded image. In this example, the communication data embedded image 932 is formed by embedding the obtained RGB values 952 in the 8×8 RGB pixel arrays 912, and is to be transmitted by the transmitter. The RGB values 952 will be applied to a light emitting device driver that drives the light emitting device to output a communication data embedded image.

Figure 10:
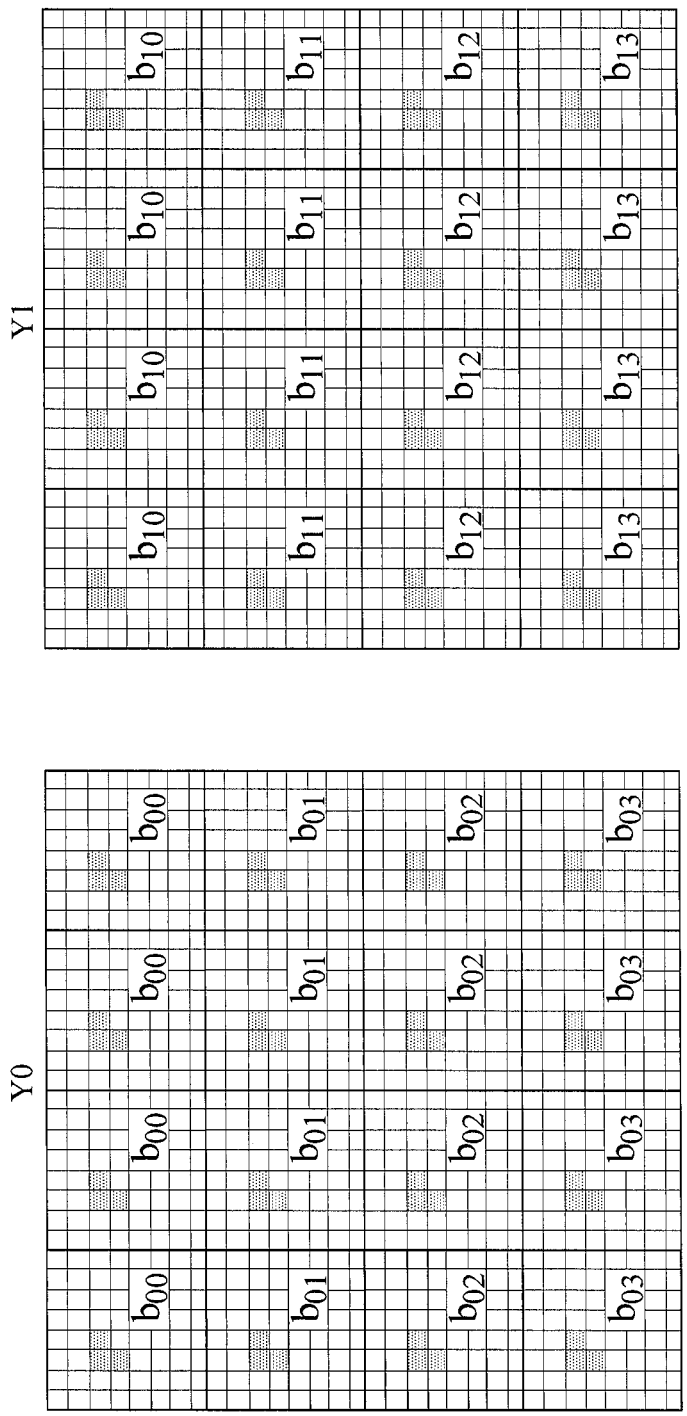
FIG. 10 shows a first exemplar for the communication processed data embedding with a BPSK modulation scheme, according to an exemplary embodiment.

By properly choosing the one or more frequency coefficients for communication processed data embedding, for example but not limits to the middle-low frequency coefficients, the distortion after embedding the communication processed data may not be sensible by human eyes. The following examples illustrate some schema for the communication processed data embedding. FIG. 10 shows a first exemplar for the communication processed data embedding with a BPSK modulation scheme, according to an exemplary embodiment. In the exemplar of FIG. 10, an image is for example, but not limited to, composed of a plurality of 8×8 pixel arrays, and each of a plurality of DCT blocks is of a size 8×8. Here the communication processed data is a binary bit stream represented by $\{b_{00}, b_{01}, \ldots, b_{13}\}$, where $b_{ij}$ denotes the jth-bit embedded in a i-th frame. Let $Y_0, Y_1$ be two Y components of a DCT result at time instance 0, 1 respectively. Let $\{f_{i0}, f_{i1}, \ldots, f_{i(N-1)}\}$ be N frequency coefficients for embedding the communication processed data, where N is the number of the frequency coefficients in each DCT block. For the BPSK modulation scheme, the values of $f_{i0}, f_{i1}, \ldots,$ and $f_{i(N-1)}$ are set to be $f_{i0}=f_{i1}=\ldots=f_{i(N-1)}=+m$ or $f_{i0}=f_{i0}=\ldots=f_{i(N-1)}=-m$ according to the input bit in the communication processed data. In the exemplar of FIG. 10, three frequency coefficients marked by three slash squares, respectively, are used for embedding the communication processed data with the BPSK modulation. In this case, we have N=3 and m=4. The 12 low and middle coefficients of the 4 DCT blocks on the $1^{St}$ row are all set to the value −4 or 4 according to $b_{00}$, the 12 low and middle frequency coefficients of the 4 DCT blocks on the $2^{nd}$ row are all set to the value of $b_{01}$, and so on.

Figure 11:
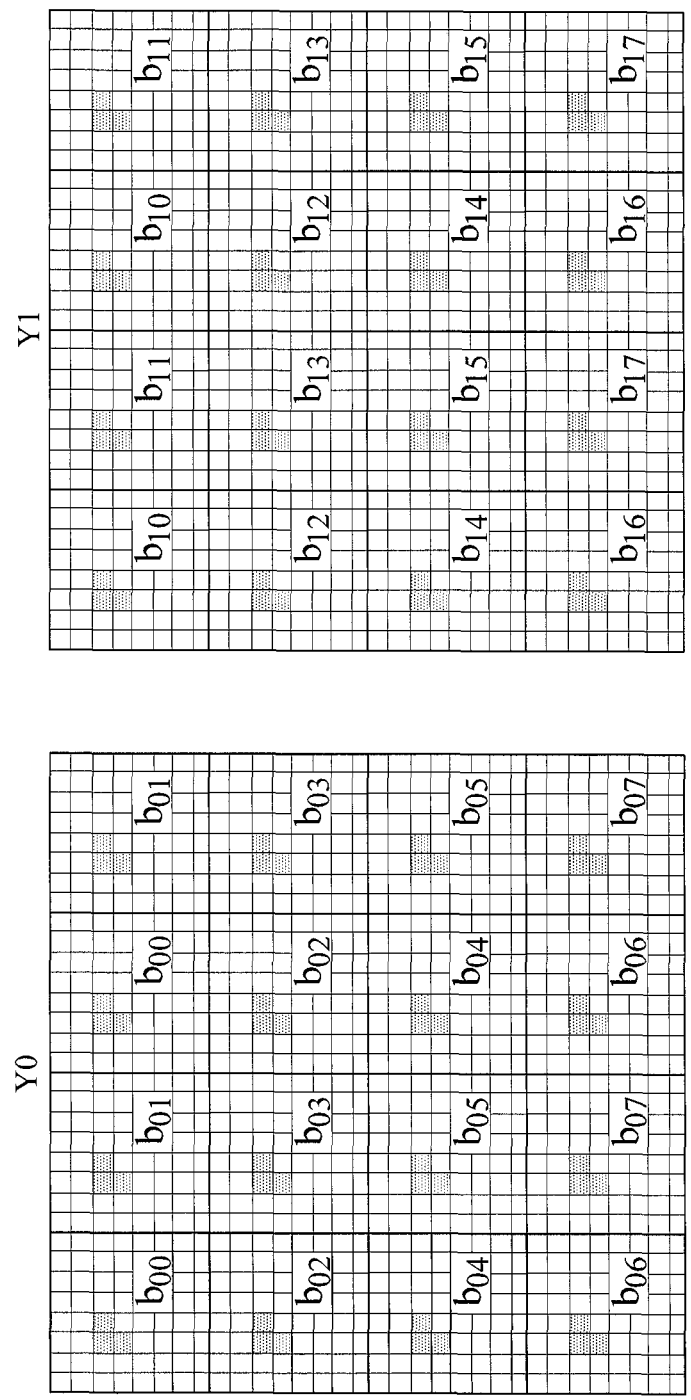
FIG. 11 shows a second exemplar for the communication processed data embedding with a BPSK modulation scheme, according to an exemplary embodiment.

FIG. 11 shows a second exemplar for the communication processed data embedding by a BPSK modulation scheme in an interleaved fashion, according to an exemplary embodiment. In the exemplar of FIG. 11, the communication processed data $\{b_{00}, b_{01}, \ldots, b_{17}\}$ is embedded and interleaved in the low and middle coefficients of DCT blocks with a BPSK modulation scheme. When the input bit value of the communication processed data is 1, the low and middle coefficients (represented by the slash squares) of the associated DCT blocks are set to the value 4; otherwise, the coefficients are set to −4. In this exemplar, the 6 low and middle coefficients of two DCT blocks on the $1^{st}$ row are set according to the value of $b_{00}$, and the 6 low and middle coefficients of the other two DCT blocks on the $1^{st}$ row are set according to the value of $b_{01}$, and so on.

Figure 12:
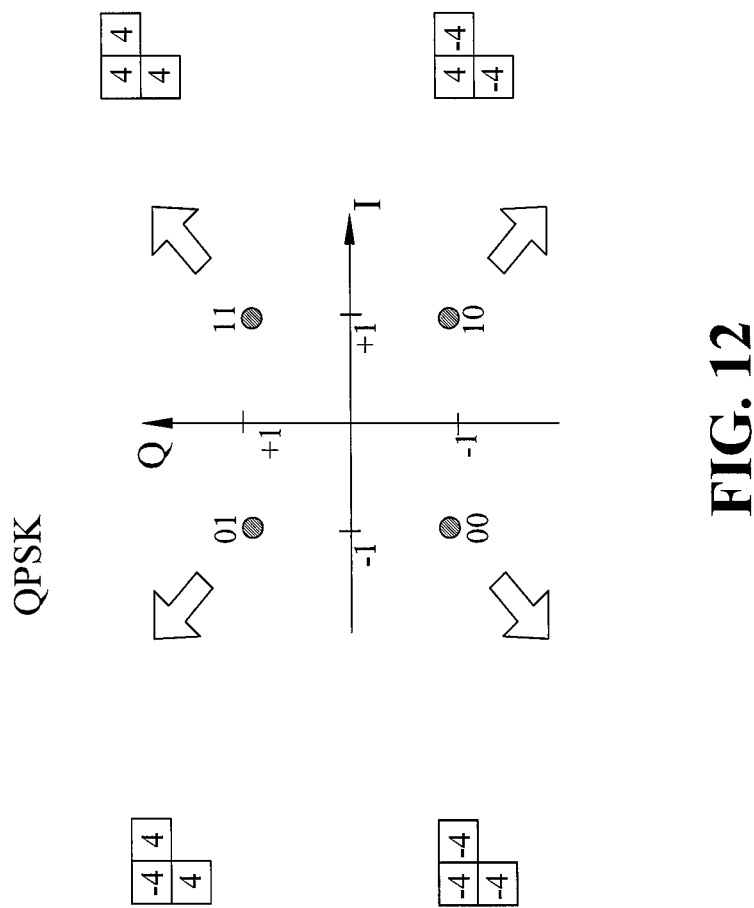
FIG. 12 shows a third exemplar for the communication processed data embedding with a QPSK modulation scheme, according to an exemplary embodiment.

FIG. 12 shows a third exemplar for the communication processed data embedding with a QPSK pattern, according to an exemplary embodiment. In the exemplar, each of a plurality of DCT blocks is of size 8×8 and each small square in represents a coefficient in a DCT block. The communication processed data is composed of QPSK symbols. Let $\{f_{i0\_00}, f_{i1\_00}, \ldots, f_{i(N-1)\_00}\}$, $\{f_{i0\_01}, f_{i1\_01}, \ldots, f_{i(N-1)\_01}\}$, $\{f_{i0\_10}, f_{i1\_10}, \ldots, f_{i(N-1)\_10}\}$ and $\{f_{i0\_11}, f_{i1\_11}, \ldots, f_{i(N-1)\_11}\}$ be the N frequency coefficients in each DCT block for 4 QPSK symbols 00, 01, 10, 11 respectively, where N is the number of the frequency coefficients in each DCT block. In the example of FIG. 12, we have N=3. When the QPSK symbols in the communication processed data are 00, 01, 10, 11, the low and middle coefficients (represented by slash squares) of a corresponding DCT block are replaced by $\{-4, -4, -4\}$, $\{-4, 4, 4\}$, $\{4, -4, -4\}$ and $\{4, 4, 4\}$ respectively.

Figure 13:
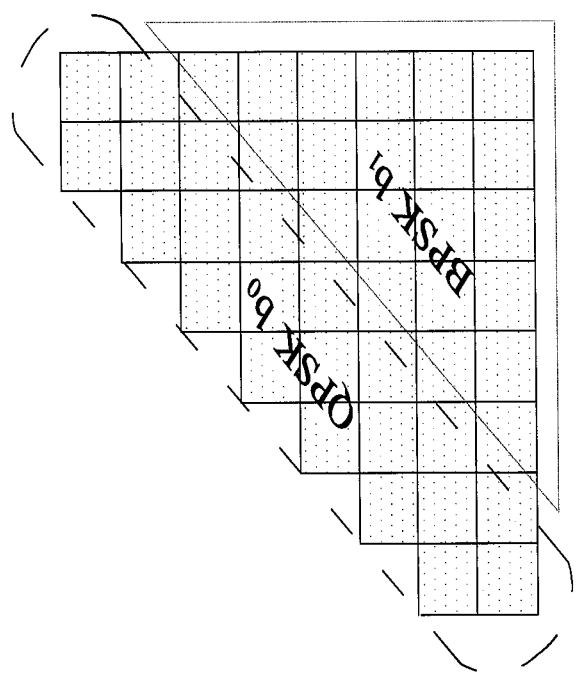
FIG. 13 shows a fourth exemplar for the communication processed data embedding by a mixed BPSK and QPSK modulation scheme, according to an exemplary embodiment.

FIG. 13 shows a fourth exemplar for the communication processed data embedding by a mixed BPSK and QPSK modulation scheme, according to an exemplary embodiment. In the exemplar, the pixel arrays and the DCT blocks are both of the size 8×8, and two modulation schemes are mixed in a block. Since an image may suffer from noise and geometrical deformation when receiving from an image sensing device, the coefficients of the middle frequencies are more reliable than those of the high frequencies. Thus the communication processed data may be embedded in the high frequency coefficients with a strong modulation scheme, and in the middle frequency coefficients with a weaker modulation scheme. In this exemplar, the communication processed data is embedded in the middle frequency coefficients with the QPSK modulation, and in the high frequency coefficients with the BPSK modulation.

Figure 14:
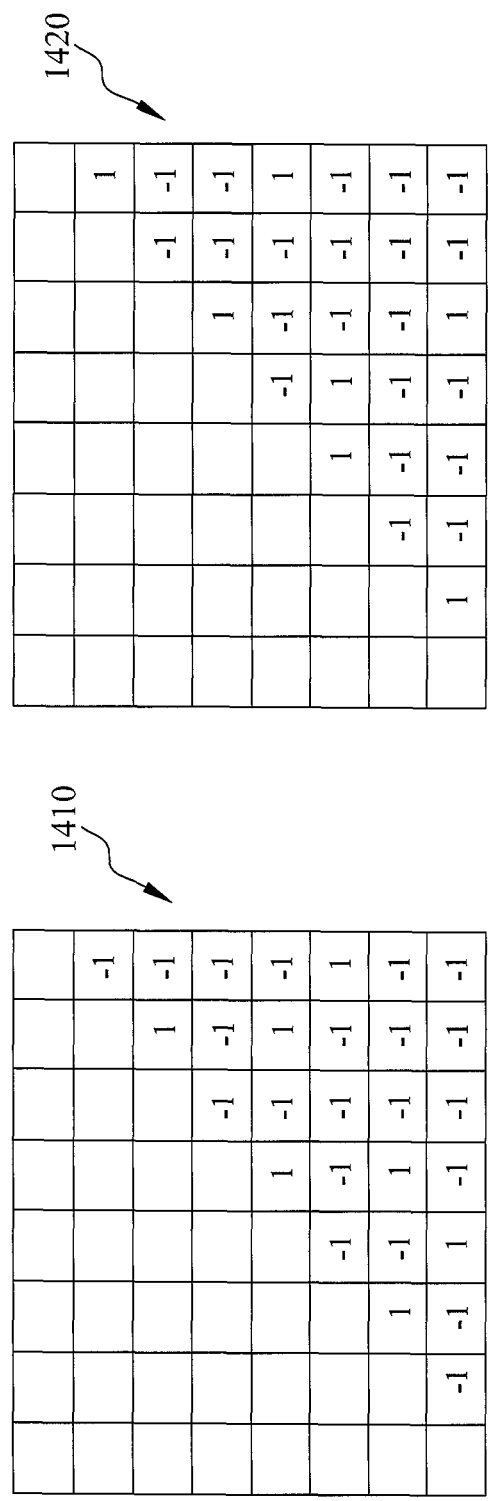
FIG. 14 shows a fifth exemplar for the communication processed data embedding with a spread spectrum sequence, according to an exemplary embodiment.

FIG. 14 shows a fifth exemplar for the communication processed data embedding with a spread spectrum sequence, according to an exemplary embodiment. In the exemplar, the pixel arrays and the DCT blocks are both of the size 8×8. The communication processed data is represented by a binary bit stream. Let $\{f_{i0\_0}, f_{i1\_0}, \ldots, f_{i(N-1)\_0}\}$ and $\{f_{i0\_1}, f_{i1\_1}, \ldots, f_{i(N-1)\_1}\}$ be the N frequency coefficients in each DCT block for embedding bit 0 and bit 1 respectively, where N is the number of the frequency coefficients in each DCT block, and the values of these $f_{i\_j}$ may be different. In the exemplar of FIG. 14, we have N=28, and a communication processed data with bit value 0 being embedded in the frequency coefficients with a spread spectrum pattern (sequence) 1410, and that with bit value 1 being embedded in the coefficients with a spread spectrum pattern (sequence) 1420. Different combinations of the frequency coefficients may be used to represent the spread spectrum coding. The receiver may extract the coefficients in the frequency domain as input signals, and calculate the correlation with the two spread spectrum sequences to recover the communication processed data. For example, when the correlation between an input signals and the sequence of value 0 is greater than the the correlation between an input signals and the sequence of value 1, the spread spectrum code is 0; otherwise, the spread spectrum code is 1.

Figure 15:
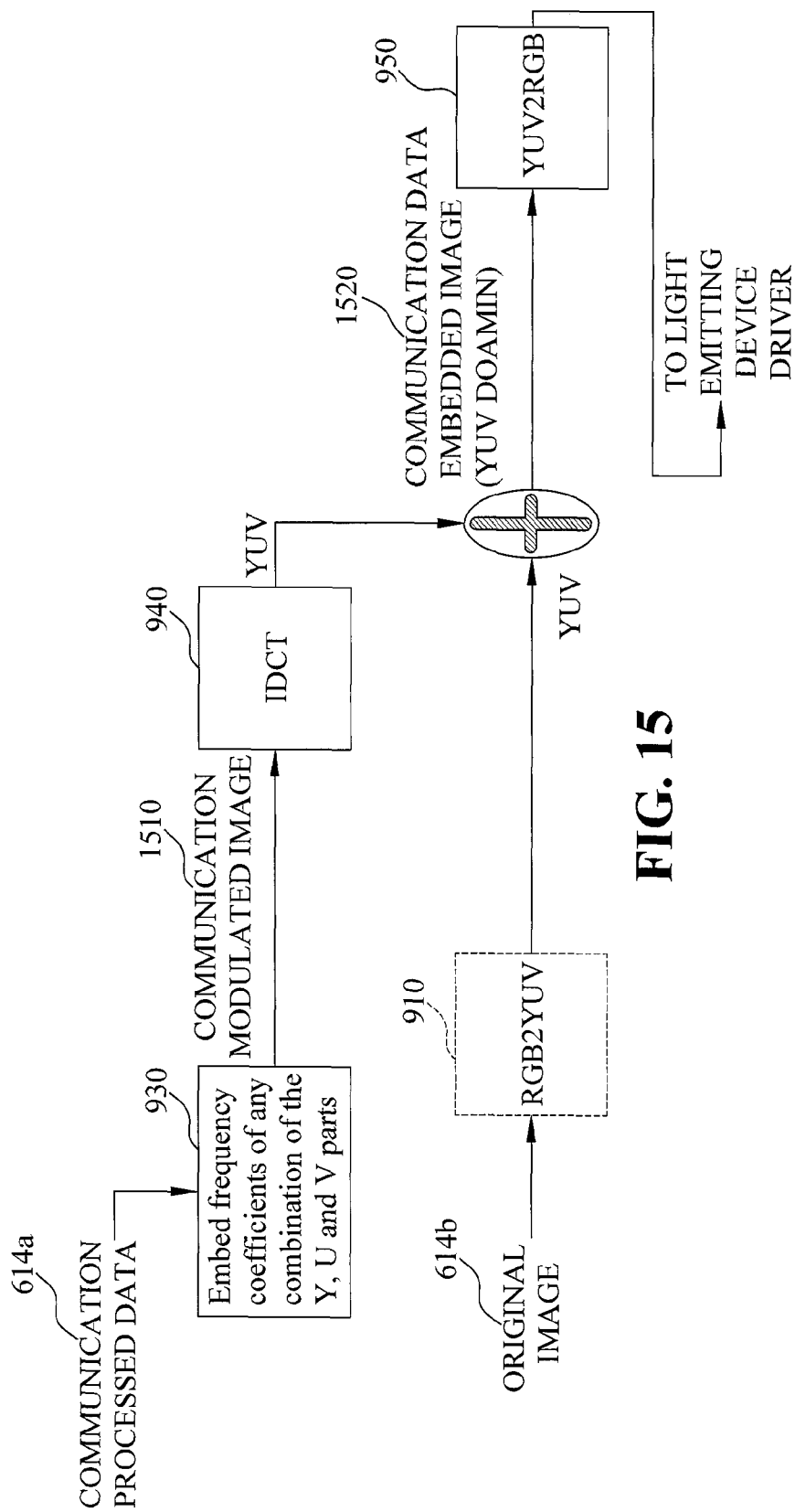
FIG. 15 shows a first exemplar that embeds the communication modulated image in the spatial YUV domain with the original image, according to an exemplary embodiment.
Figure 16:
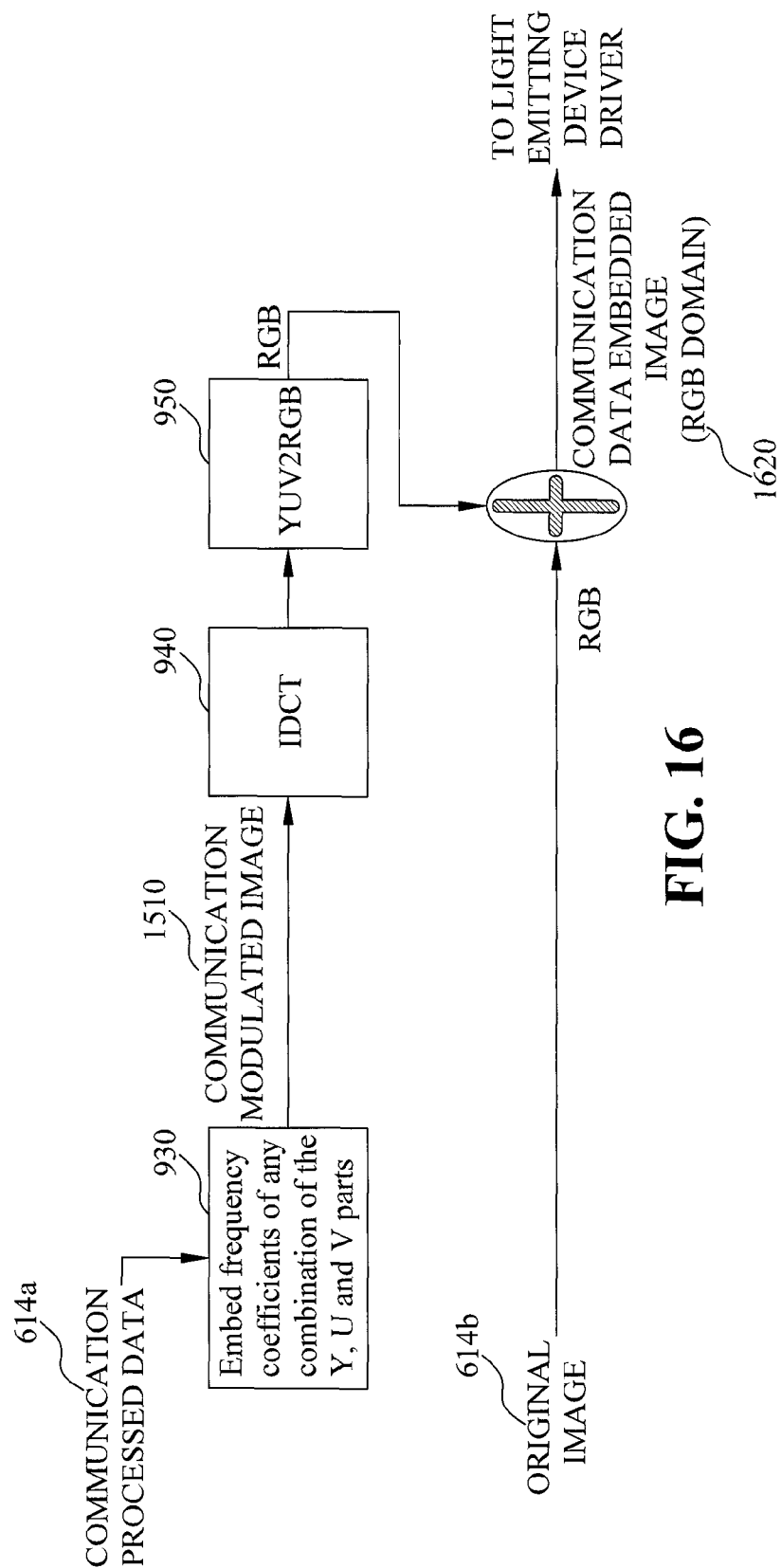
FIG. 16 shows a second exemplar that embeds the communication modulated image in the spatial RGB domain with the original image, according to an exemplary embodiment.

There are different schemes in the transmitter for the communication processed data embedding with the original image. Two exemplars are shown in FIG. 15 and FIG. 16, respectively. FIG. 15 shows a first exemplar that embeds the communication modulated image in the spatial YUV domain with the original image, according to an exemplary embodiment. In the exemplar of FIG. 15, before embedding the communication processed data, the preprocessor such as a RGB2YUV 910 may transfer the pixel arrays of the original image from a first spatial domain such as a RGB domain to a second spatial domain such as a YUV (or YCbCr) domain. After the preprocessing, the data embedding unit 614 may embed the communication processed data at the coefficients in the frequency domain, such as embed frequency coefficients of any combination of the Y, U, and V parts as labeled by 930, according to a modulation scheme and generates the communication modulated image 1510 with the embedded frequency coefficients, and performs an IDCT transform. The data embedding unit generates a communication data embedded image 1520 in the spatial YUV domain by embedding the communication modulated image 1510 with the original image in the spatial YUV domain. Finally, the data embedding unit transforms the communication data embedded image 1520 from the spatial YUV (YCbCr) domain to the spatial RGB domain, to get the RGB values of the communication data embedded image in the spatial RGB domain for light communication.

FIG. 16 shows a second exemplar that embeds the communication modulated image in the spatial RGB domain with the original image, according to an exemplary embodiment. In the exemplar of FIG. 16, no preprocessing process is performed. The data embedding unit 614 embeds the communication processed data at the coefficients in the frequency domain according to a modulation scheme to generate the communication modulated image 1510, performs an IDCT transform of the communication modulated image 1510, and transforms the communication modulated image 1510 from the YUV (YCbCr) domain to the RGB domain to get the RGB values of a communication modulated image 1620 in the spatial RGB domain sequentially. Finally, the data embedding unit 614 embeds the RGB values of the communication modulated image in the RGB values of the original image in the spatial RGB domain to generate a communication data embedded image 1620 in the spatial RGB domain for light communication.

Figure 17:
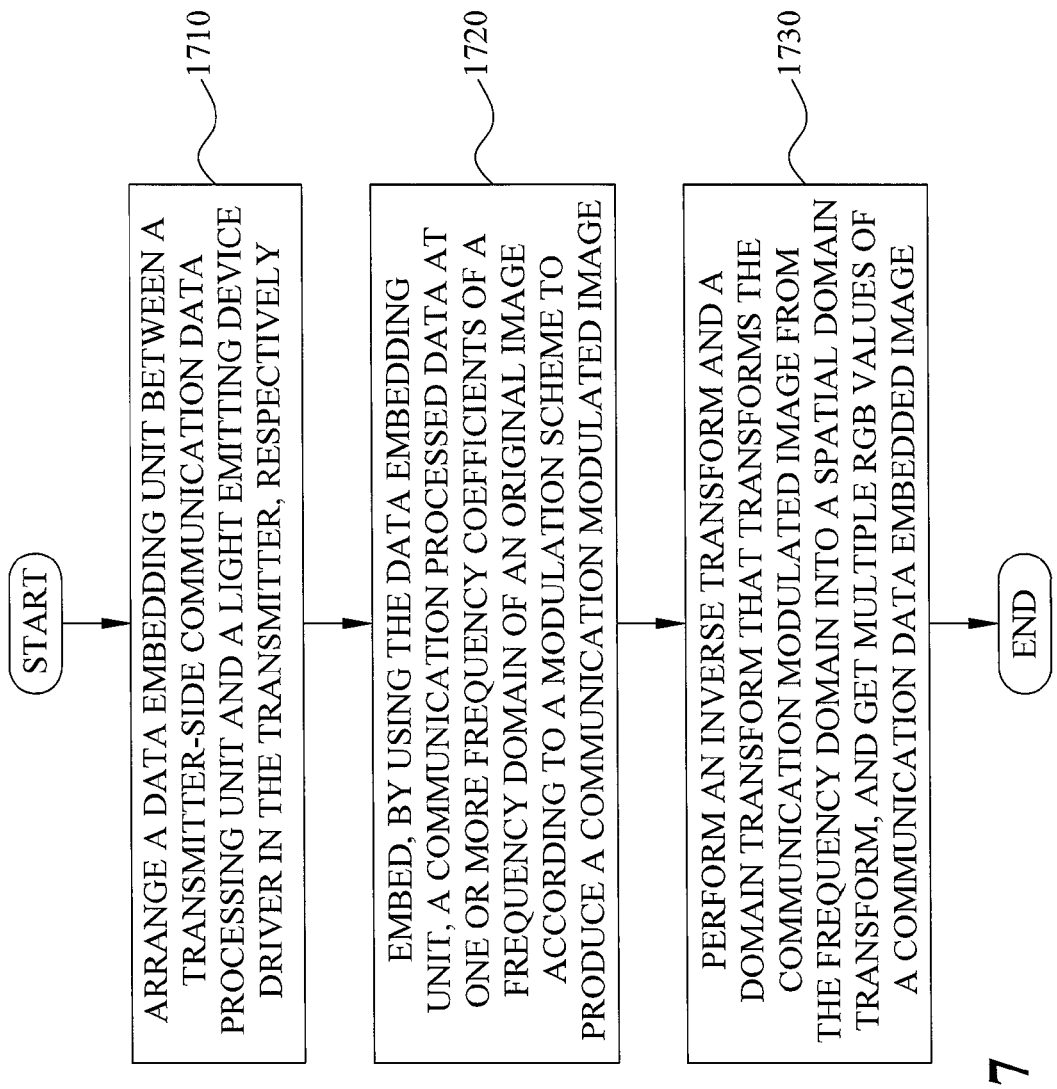
FIG. 17 shows a method for data embedding in light communication, adapted to a transmitter, according to an exemplary embodiment.

As has been described above, a method for data embedding in light communication, adapted to a transmitter, may be illustrated in FIG. 17, according to an exemplary embodiment. In the FIG. 17, the method may arrange a data embedding unit between a transmitter-side communication data processing unit and a light emitting device driver in the transmitter (step 1710), and embeds, by using the data embedding unit, a communication processed data at one or more frequency coefficients of a frequency domain of an original image according to a modulation scheme to generate a communication modulated image (step 1720), performs an inverse transform and a domain transform that transforms the communication modulated image from the frequency domain into a spatial domain, and gets multiple RGB values of a communication data embedded image (step 1730), wherein the communication data embedded image is formed by embedding the multiple RGB values with the original image.

As mentioned earlier, when a preprocessing process is performed according an external indicator, the original image may be transformed from a RGB spatial domain to a spatial YUB domain. After the preprocessing process has completed and the communication modulated image is generated, the method may generate the communication data embedded image by embedding the communication modulated image with the original image in the spatial YUV domain, transform the communication data embedded image from the spatial YUV domain to the spatial RGB domain, to get the multiple RGB values of the communication data embedded image for light communication. When no preprocessing process is performed, the method may transform the communication modulated image from the YUV (YCbCr) domain to the RGB domain after having performed an IDCT transform, to get the RGB values of the communication modulated image in the spatial RGB domain sequentially, embed the RGB values of the communication modulated image in the RGB values of the original image in the spatial RGB domain to generate a communication data embedded image in the spatial RGB domain for light communication.

As has been described above, the method for data embedding in light communication may embed the communication processed data at the one or more frequency coefficients of any combination of the Y, U and V parts of the DCT blocks according to a modulation coding scheme. The communication processed data embedding with different modulation schemes such as, but not limited to, the examples shown in FIG. 10 to FIG. 14 may be applied to the method.

Figure 18:
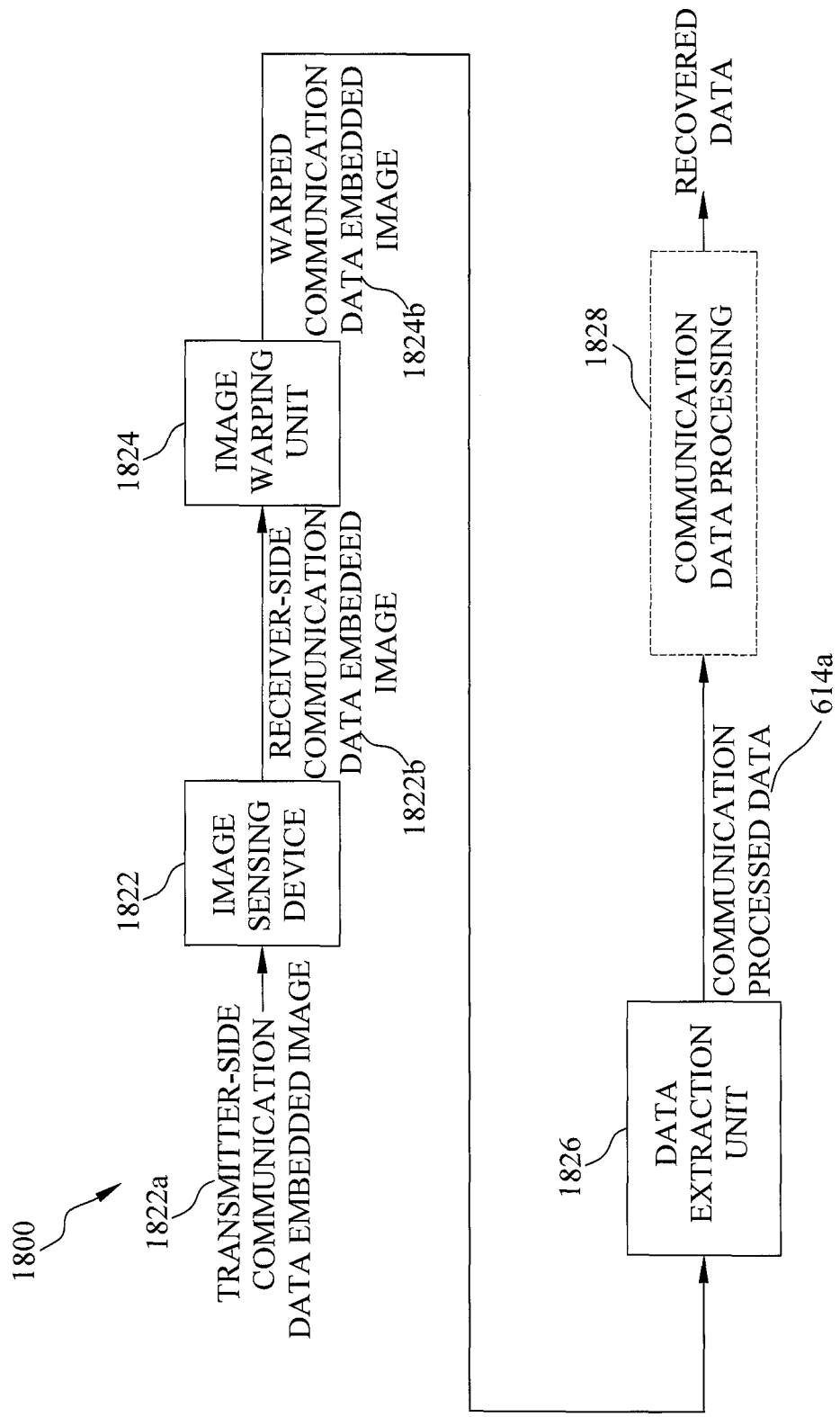
FIG. 18 shows a receiving apparatus for data embedding in light communication, according to an exemplary embodiment.

When a communication data embedded image is transmitted by the light emitting device 618 via a channel for light communication, one exemplary embodiment of a receiving apparatus for data embedding in light communication may refer to FIG. 18. In FIG. 18, the receiving apparatus for data embedding in light communication 1800 may comprise an image sensing device 1822, an image warping unit 1824, and a data extraction unit 1826. The image sensing unit 1822 may detect a transmitter-side communication data embedded image 1822a transmitted by the light emitting device 618 via a channel, and generate a receiver-side communication data embedded image 1822b. Because the size and the shaping of the receiver-side communication data embedded image 1822b may be different from the transmitter-side communication data embedded image 1822a, the image warping unit 1824 is configured to compensate the deformation of the receiver-side communication data embedded image 1822b by performing an image warping processing on the transmitter-side communication data embedded image 1822a, and outputs a warped communication data embedded image 1824b. The data extraction unit 1826 is configured to extract the communication processed data 614a from the warped communication data embedded image 1824b. The receiving apparatus may further perform a communication data processing 1828 on the communication processed data 614a to obtain the recovered data.

Figure 19:
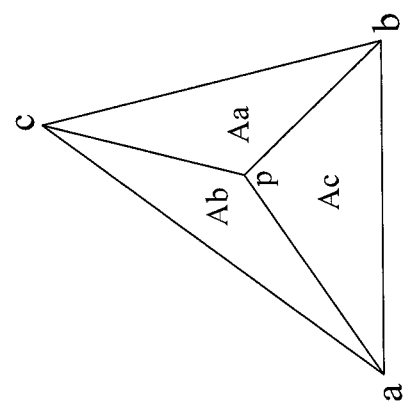
FIG. 19 shows a barycentric coordinate conversion of a point in a triangle in the image warping processing, according to an exemplary embodiment.

The image warping processing performed by the image warping unit 1824 may include a coordinate conversion on a plurality of pixel data in the area of the transmitter-side communication data embedded image 1822a, and a coordinate such as a barycentric coordinate may be used in the image warping process. FIG. 19 shows the barycentric coordinate conversion of a point in a triangle in the image warping processing, according to an exemplary embodiment. Let abc is a triangle defined by its vertices a, b and c. A point p inside the triangle abc may be represented as $\alpha a+\beta b+\gamma c$, where $\alpha$, $\beta$ and $\gamma$ may be calculated by the area ratio of each triangle, and must meet the constraint $\alpha+\beta+\gamma=1$. In other words, the point p and the constraint may be expressed by the following formulas.

$$p=\alpha a+\beta b+\gamma c, \text{ and } \alpha=A_a/A, \beta=A_b/A, \gamma=A_c/A, \alpha+\beta+\gamma=1,$$

Where $A_a$ is the area of the triangle bcp, $A_b$ is the area of the triangle cap, and $A_c$ is the area of the triangle abp, and A is the area of the triangle abc.

Figure 20:
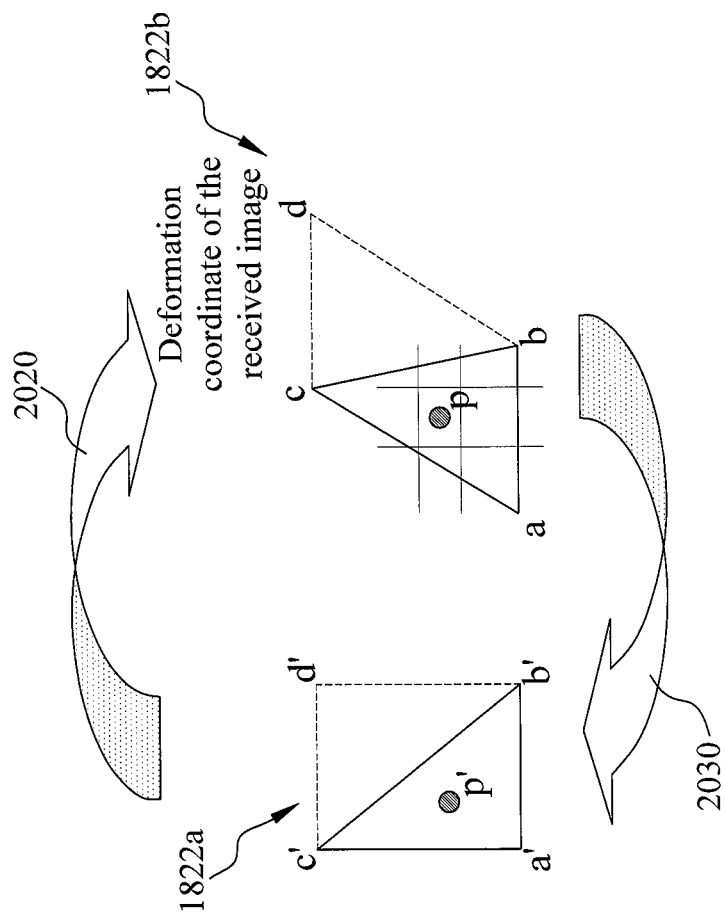
FIG. 20 shows the operation of the image warping processing, according to an exemplary embodiment.

Based on the barycentric coordinate, FIG. 20 shows the operation of the image warping unit, according to an exemplary embodiment. Referring to FIG. 20, the image warping unit may divide the transmitter-side communication data embedded image 1822a into several triangles, with a triangle a' b' c' in the transmitter-side communication data embedded image 1822a corresponding to a triangle abc in the receiver-side communication data embedded image 1822b, and calculate a corresponding barycentric coordinate $(\alpha, \beta, \gamma)_p$, for each point p' in each triangle a'b'c', and perform a step 2020 of calculating a corresponding point $p=\alpha a+\beta b+\gamma c$ in the receiver-side communication data embedded image 1822b after deformation, for each point p' in each triangle a'b'c' of the transmitter-side communication data embedded image 1822a. And for each point p' in each triangle a'b'c' of the transmitter-side communication data embedded image 1822a, the image warping unit may further perform a step 2030 of a pixel value interpolation by the received pixels around p to recover the pixel value of p'. After performing the barycentric coordinate conversion on the points in the area of the transmitter-side communication data embedded image 1822a, the pixel values of the transmitter-side communication data embedded image 1822a can be recovered by the pixel values of the receiver-side communication data embedded image 1822b in the image warping processing.

Figure 21:
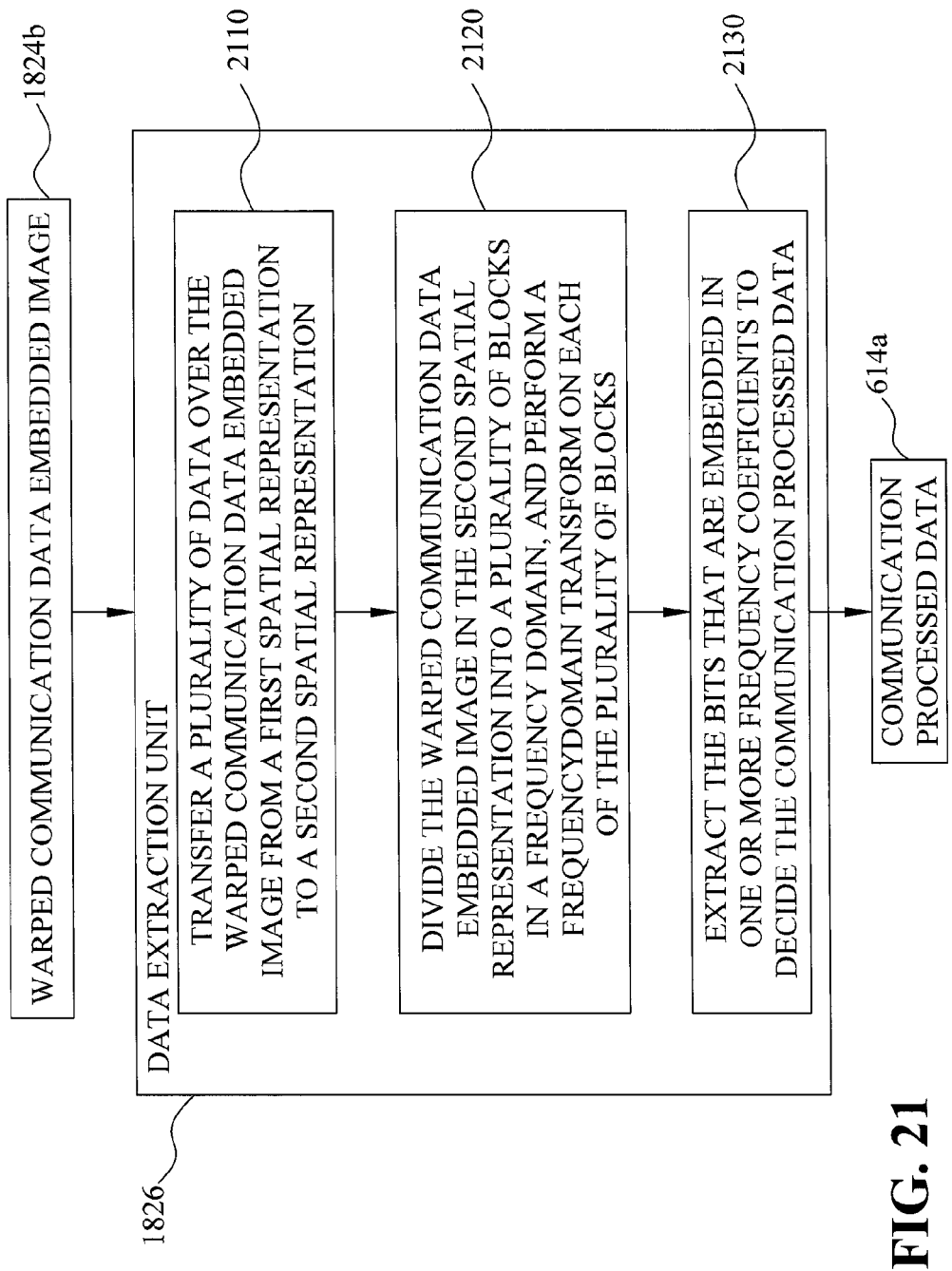
FIG. 21 shows the operation of the data extraction unit, according to an exemplary embodiment.

The operation performed by the data extraction unit 1826 may be shown in FIG. 21, according to an exemplary embodiment. Referring to FIG. 21, the data extraction unit 1826 may transfer a plurality of data over the warped communication data embedded image 1824b from a first spatial representation such as a RGB representation to a second spatial representation such as a YUV (or YCbCr) representation (step 2110), divide the warped communication data embedded image in the second spatial representation such as the YUV representation into a plurality of blocks in a frequency domain, and perform a frequency domain transform (such as DCT or wavelet) on each of the plurality of blocks (step 2120), extract the bits that are embedded in one or more frequency coefficients (step 2130) to decide the communication processed data 614a by performing a majority voting, demapping or pattern matching on the extracted bits of the one or more frequency coefficients. The receiving apparatus for light communication may further include a receiver-side communication data processing unit that may perform the common communication data processing in the receiving apparatus, such as demodulation and error correction, to recover the communication data from the extracted communication processed data, and outputs the recovered data.

Figure 22:
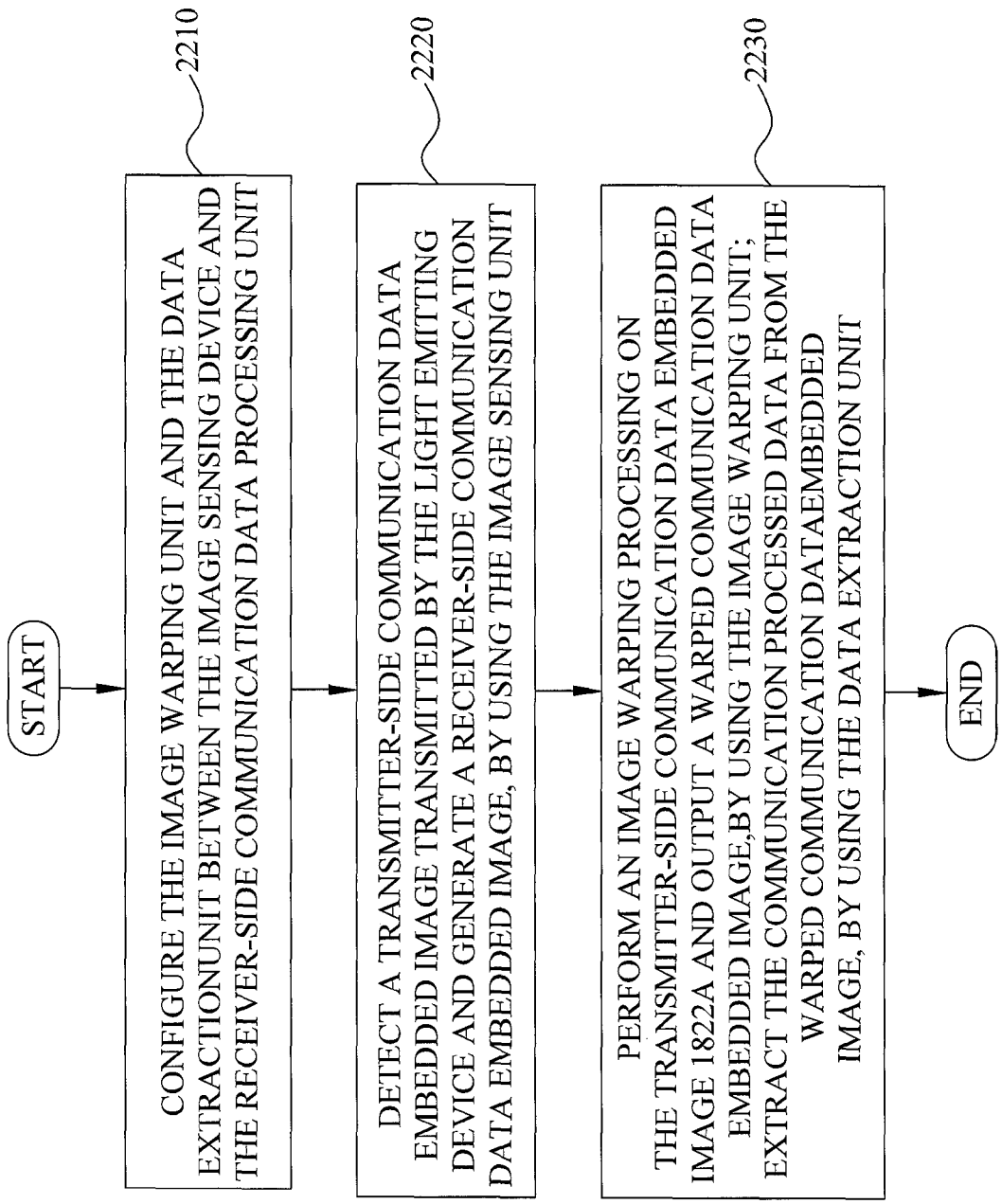
FIG. 22 shows a receiving method for data embedding in light communication, according to an exemplary embodiment.

Accordingly, a receiving method for data embedding in light communication may be illustrated in FIG. 22, according to an exemplary embodiment. In the FIG. 22, the receiving method for data embedding in light communication may configure an image warping unit and a data extraction unit between an image sensing device and a receiver-side communication data processing unit (step 2210); detect a transmitter-side communication data embedded image transmitted by the light emitting device and generate a receiver-side communication data embedded image, by using the image sensing unit (step 2220); perform an image warping processing on the transmitter-side communication data embedded image and output a warped communication data embedded image, by using the image warping unit; and extract the communication processed data from the warped communication data embedded image, by using the data extraction unit (step 2230).

For an exemplar of the communication processed data embedded with a spread spectrum sequence, the receiving method for data embedding in light communication may perform an image warping on a receiver-side communication data embedded image and transfer the data points over a warped communication data embedded image from a RGB representation to a YUV representation, perform a DCT on each such as 8×8 block and extract one or more frequency coefficients of each block, and perform a sequence matching of each block and do a majority voting of a group of blocks. The detected communication processed data may be further applied to a receiver-side communication data processing unit.

As has been described above, one exemplary embodiment of a light communication system may comprise a transmitter and a receiving apparatus. The transmitter may be configured to embed a communication processed data at one or more frequency coefficients of a frequency domain transform of an original image, to generate a communication modulated image, perform an inverse transform and a domain transform on the communication modulated image, and form a communication data embedded image by embedding multiple RGB values in the original image. The receiving apparatus may be configured to detect the communication data embedded image transmitted by a light emitting device and generate a receiver-side communication data embedded image, and perform an image warping processing to recover the transmitter-side communication data embedded image by the receiver-side communication data embedded image, and extract the communication processed data from a warped communication data embedded image.

The transmitter in the light communication system may further include a light emitting device driver to drive the light emitting device to transmit the communication data embedded image. The transmitter may also include a preprocessor that performs a pre-processing procedure before embedding the communication processed data according to an external indicator. If the pre-processing procedure is not required, the communication data embedded image is formed by embedding the communication modulated image in a spatial RGB domain with the original image in the spatial RGB domain.

Accordingly, according to an exemplary embodiment, in a transmitter, a light communication method may embed a communication processed data at one or more frequency coefficients of a frequency domain transform of an original image, to generate a communication modulated image, perform an inverse transform and a domain transform on the communication modulated image, and form a communication data embedded image by embedding multiple RGB values in the original image. In a e receiving apparatus, the light communication method may detect the communication data embedded image transmitted by a light emitting device and generate a receiver-side communication data embedded image, and perform an image warping processing to recover the communication data embedded image by the receiver-side communication data embedded image, and extract the communication processed data from a warped communication data embedded image.

The details of performing a pre-processing procedure before embedding the communication processed data, forming the communication data embedded image, performing the image warping processing, and extracting the communication processed data have been described in the earlier exemplary embodiments, and are omitted here.

In summary of the disclosure, the disclosed exemplary embodiments provide an apparatus and method for data embedding in light communication, and the light communication system and method thereof. The technique employs a data embedding technique for the communication processed data before applying the communication processed data to the light emitting device driver or the image/video display driver. Instead of directly applying the communication processed data to the light emitting device driver with existing light communication technologies, the disclosed exemplary embodiments embed the communication processed data on the eye insensitive part of the frequency coefficients in the spatial domain of the original image or the video when light communication is performed. Therefore, the disclosed exemplary embodiments may perform image or video display and light communication simultaneously.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for data embedding in light communication, adapted to a transmitter, said apparatus comprising:
    a data embedding unit arranged between a transmitter-side communication data processing unit and a light emitting device driver in the transmitter, said data embedding unit embedding a communication processed data at a spatial domain of an image according to a modulation scheme;
    wherein said data embedding unit generates a communication modulated image by embedding the communication processed data at one or more frequency coefficients in a frequency domain of the image in order to generate a communication data embedded image, and gets multiple RGB values for the communication data embedded image.

2. The apparatus as claimed in claim 1, wherein the data embedding unit generates the communication data embedded image by embedding the communication modulated image in the image in the frequency domain, performing a frequency domain transform, and transferring a plurality of luminance and chrominance data of the communication data embedded image to the multiple RGB values.

3. The apparatus as claimed in claim 1, wherein the data embedding unit performs a domain transform from the frequency domain to a spatial RGB domain for the communication modulated image, and transfers a plurality of resulted luminance and chrominance data to the multiple RGB values, and generates the communication data embedded image by embedding the multiple RGB values in the image.

4. The apparatus as claimed in claim 1, wherein the data embedding unit performs a domain transform from the frequency domain to the spatial domain for the communication modulated image, and generates the communication data embedded image by embedding a transformed result with the image and transferring a plurality of resulted luminance and chrominance data of the communication data embedded image to the multiple RGB values.

5. An apparatus for data embedding in light communication, adapted to a transmitter, said apparatus comprising:
    a data embedding unit arranged between a transmitter-side communication data processing unit and a light emitting device driver in the transmitter, wherein said data embedding unit embeds a communication processed data at a spatial domain of an image according to a modulation scheme, and gets multiple RGB values for a communication data embedded image;
    wherein said apparatus further includes a preprocessor that transfers a plurality of pixel arrays of the image from a first spatial domain to a second spatial domain before embedding the communication processed data according to an external indicator.

6. The apparatus as claimed in claim 5, wherein the data embedding unit generates a communication modulated image by embedding the communication processed data at one or more frequency coefficients in of a frequency domain of the image.

7. The apparatus as claimed in claim 5, wherein said preprocessor further performs a discrete cosine transform on the plurality of pixel arrays in the second spatial domain.

8. The apparatus as claimed in claim 5, wherein said preprocessor transfers the plurality of pixel arrays of the image from a spatial RGB domain to a spatial YUV or YCbCr domain and performs a discrete cosine transform on the plurality of pixel arrays in the spatial YUV or YCbCr domain.

9. An apparatus for data embedding in light communication, adapted to a transmitter, said apparatus comprising:
    a data embedding unit arranged between a transmitter-side communication data processing unit and a light emitting device driver in the transmitter, wherein said data embedding unit embeds a communication processed data at a spatial domain of an image according to a modulation scheme, and gets multiple RGB values for a communication data embedded image;
    wherein the data embedding unit embeds the communication processed data by inserting one or more frames modulated by one or more image intensities inter a plurality of frames over the image.

10. The apparatus as claimed in claim 9, wherein the one or more frames inserted are modulated by one or more intensities of one or more partial images in different regions over the image.

11. A method for data embedding in light communication, adapted to a transmitter, said method comprising:
    arranging a data embedding unit between a transmitter-side communication data processing unit and a light emitting device driver in the transmitter;
    embedding, by using the data embedding unit, a communication processed data at a spatial domain of an image according to a modulation scheme to generate a communication modulated image by embedding the communication processed data at one or more frequency coefficients in a frequency domain of the image; and
    performing an inverse transform and a domain transform that transforms the communication modulated image from the frequency domain into the spatial domain in order to generate a communication data embedded image, and getting multiple RGB values for the communication data embedded image.

12. A method for data embedding in light communication, adapted to a transmitter, said method comprising:
- arranging a data embedding unit between a transmitter-side communication data processing unit and a light emitting device driver in the transmitter;
- embedding, by using the data embedding unit, a communication processed data at a spatial domain of an image according to a modulation scheme to generate a communication modulated image; and
- performing an inverse transform and a domain transform that transforms the communication modulated image from a frequency domain into the spatial domain, and getting multiple RGB values for a communication data embedded image;
- wherein said method further transfers a plurality of pixel arrays of the image from a first spatial domain to a second spatial domain before embedding the communication processed data according to an external indicator.

13. The method as claimed in claim 11, wherein said method further includes:
- transferring a plurality of pixel arrays of the image from a first spatial domain to a second spatial domain before embedding the communication processed data according to an external indicator.

14. The method as claimed in claim 11, wherein said method embeds the communication processed data at one or more frequency coefficients of any combination of a Y, a U and a V parts in a spatial YUV domain of one or more discrete cosine transform (DCT) blocks according to a modulation coding scheme.

15. The method as claimed in claim 14, wherein the communication processed data is embedded with one of a plurality of schemes including embedding a spread spectrum pattern, embedding a QPSK pattern, using a BPSK modulation scheme in an interleaved fashion, and using a mixed BPSK and QPSK modulation scheme.

16. The method as claimed in claim 11, wherein said method further includes:
- producing, by the data embedding unit, the communication data embedded image by embedding the communication modulated image in the frequency domain, performing the frequency domain transform, and transferring a plurality of luminance and chrominance data to the multiple RGB values.

17. The method as claimed in claim 11, wherein said method further includes:
- performing, by the data embedding unit, a domain transform from the frequency domain to a spatial RGB domain for the communication modulated image, transferring a plurality of resulted luminance and chrominance data to the multiple RGB values, and producing the communication data embedded image by embedding the multiple RGB values in the image.

18. The method as claimed in claim 11, wherein said method further includes:
- performing, by the data embedding unit, a domain transform from the frequency domain to the spatial domain for the communication modulated image, and producing the communication data embedded image by embedding a transformed result with the image and transferring a plurality of resulted luminance and chrominance data of the communication data embedded image to the multiple RGB values.

19. The method as claimed in claim 12, wherein said external indicator is generated by using a software programming register or a hardware element.

20. The method as claimed in claim 12, wherein said method further includes:
- producing the communication modulated image by embedding the communication processed data at one or more frequency coefficients in the frequency domain.

21. A method for data embedding in light communication, adapted to a transmitter, said method comprising:
- arranging a data embedding unit between a transmitter-side communication data processing unit and a light emitting device driver in the transmitter;
- embedding, by using the data embedding unit, a communication processed data at a spatial domain of an image according to a modulation scheme to generate a communication modulated image; and
- performing an inverse transform and a domain transform that transforms the communication modulated image from the frequency domain into the spatial domain, and getting multiple RGB values for a communication data embedded image;
- wherein said method embeds the communication processed data by inserting one or more frames modulated by one or more image intensities inter a plurality of frames over the image.

22. The method as claimed in claim 21, wherein the one or more frames inserted are modulated by one or more intensities of one or more partial images in different regions over the image.

23. A receiving apparatus for data embedding in light communication, comprising:
- an image sensing device that detects a transmitter-side communication data embedded image transmitted by a light emitting device, and generates a receiver-side communication data embedded image;
- an image warping unit that compensates a deformation of the receiver-side communication data embedded image by performing an image warping processing to perform a coordinate conversion on a plurality of pixel data in an area of the transmitter-side communication data embedded image, and outputs a warped communication data embedded image; and
- a data extraction unit that extracts a communication processed data from the warped communication data embedded image.

24. The receiving apparatus as claimed in claim 23, wherein said data extraction unit transfers a plurality of pixel data over the warped communication data embedded image from a first spatial representation to a second spatial representation, divides the warped communication data embedded image in the second spatial representation into a plurality of blocks in a spatial domain, performs a frequency domain transform on each of the plurality of blocks, and extracts one or more bits that are embedded in one or more frequency coefficients to decide the communication processed data.

25. The receiving apparatus as claimed in claim 24, wherein said data extraction unit performs a majority voting, demapping or pattern matching on the one or more bits extracted of the one or more frequency coefficients.

26. A receiving method for data embedding in light communication, comprising:
- configuring an image warping unit and a data extraction unit between an image sensing device and a receiver-side communication data processing unit;
- detecting a transmitter-side communication data embedded image transmitted by a light emitting device and generating a receiver-side communication data embedded image, by using the image sensing device;

performing an image warping processing to perform a coordinate conversion on a plurality of pixel data in an area of the transmitter-side communication data embedded image and outputting a warped communication data embedded image, by using the image warping unit; and extracting a communication processed data from the warped communication data embedded image, by using the data extraction unit.

27. The receiving method as claimed in claim 26, wherein the image warping processing further includes:

recovering the plurality of pixel data of the transmitter-side communication data embedded image by a plurality of pixel data of the receiver-side communication data embedded image.

28. The receiving method as claimed in claim 26, wherein extracting the communication processed data further includes:

transferring a plurality of data points over the warped communication data embedded image from a first spatial representation to a second spatial representation;

dividing the warped communication data embedded image in the second spatial representation into a plurality of blocks in a spatial domain, and performing a frequency domain transform on each of the plurality of blocks; and extracting one or more bits embedded in one or more frequency coefficients to decide the communication processed data.

29. The receiving method as claimed in claim 28, wherein a majority voting, a demapping or a pattern matching is performed on the one or more bits embedded in one or more frequency coefficients.

30. A light communication system, comprising:

a transmitter that embeds a communication processed data at one or more frequency coefficients in a frequency domain of an image, performs an inverse transform and a domain transform on a communication modulated image, and forms a communication data embedded image by embedding multiple RGB values in the image; and a receiving apparatus that detects the communication data embedded image transmitted by a light emitting device and generates a receiver-side communication data embedded image, and performs an image warping processing to recover the communication data embedded image by the receiver-side communication data embedded image, and extracts the communication processed data from a warped communication data embedded image.

31. The system as claimed in claim 30, wherein the transmitter further includes a light emitting device driver to drive the light emitting device to transmit the communication data embedded image.

32. The system as claimed in claim 30, wherein said transmitter further includes a preprocessor that performs a pre-processing procedure to transfer a plurality of pixel arrays of the image from a first spatial domain to a second spatial domain before embedding the communication processed data.

33. The system as claimed in claim 32, wherein the transmitter performs the pre-processing procedure according to an external indicator generated by a software programming register or a hardware element.

34. The system as claimed in claim 32, wherein said preprocessor further performs a discrete cosine transform on the plurality of pixel arrays in the second spatial domain.

35. The system as claimed in claim 30, wherein the communication data embedded image is formed by embedding the communication modulated image in a spatial RGB domain with the image in the spatial RGB domain.

36. The system as claimed in claim 30, wherein the receiving apparatus performs a coordinate conversion on a plurality of pixel data in an area of the communication data embedded image, and recovers the plurality of pixel data of the communication data embedded image by a plurality of pixel data of the receiver-side communication data embedded image in the image warping processing.

37. The system as claimed in claim 30, wherein said receiving apparatus transfers a plurality of data points over the warped communication data embedded image from a first spatial representation to a second spatial representation, and divides the warped communication data embedded image in the second spatial representation into a plurality of blocks in a spatial domain.

38. The system as claimed in claim 37, wherein the receiving apparatus performs a frequency domain transform on each of the plurality of blocks, and extracts one or more bits embedded in one or more frequency coefficients to decide the communication processed data.

39. A light communication method, comprising:

in a transmitter, embedding a communication processed data at one or more frequency coefficients in a frequency domain of an image, performing an inverse transform and a domain transform on a communication modulated image, and forming a communication data embedded image by embedding multiple RGB values in the image; and in a receiving apparatus, detecting the communication data embedded image transmitted by a light emitting device and generating a receiver-side communication data embedded image, performing an image warping processing to recover the communication data embedded image by the receiver-side communication data embedded image, and extracting the communication processed data from a warped communication data embedded image.

40. The method as claimed in claim 39, wherein said method performs a pre-processing procedure to transfer a plurality of pixel arrays of the image from a first spatial domain to a second spatial domain before embedding the communication processed data according to an external indicator.

41. The method as claimed in claim 39, wherein the image warping processing includes a coordinate conversion on a plurality of pixel data in an area of the communication data embedded image.

42. The method as claimed in claim 39, wherein in said receiving apparatus, said method further includes:

transferring a plurality of pixel data over the warped communication data embedded image from a first spatial representation to a second spatial representation;

dividing the warped communication data embedded image in the second spatial representation into a plurality of blocks in a spatial domain, and performing a frequency domain transform on each of the plurality of blocks; and extracting one or more bits embedded in one or more frequency coefficients to decide the communication processed data.

* * * * *